(12) United States Patent
Ishii

(10) Patent No.: US 10,768,191 B2
(45) Date of Patent: Sep. 8, 2020

(54) DEVICE FOR ROTATING OBJECT

(71) Applicants: HORIBA, LTD., Kyoto-shi, Kyoto (JP); HORIBA ABX SAS, Montpellier (FR)

(72) Inventor: Yuki Ishii, Kyoto (JP)

(73) Assignee: HORIBA, Ltd., Kyoto-shi, Kyoto (JP)

( * ) Notice: Subject to any disclaimer, the term of this patent is extended or adjusted under 35 U.S.C. 154(b) by 159 days.

(21) Appl. No.: 16/062,563

(22) PCT Filed: Dec. 9, 2016

(86) PCT No.: PCT/JP2016/086785
§ 371 (c)(1),
(2) Date: Jun. 14, 2018

(87) PCT Pub. No.: WO2017/104576
PCT Pub. Date: Jun. 22, 2017

(65) Prior Publication Data
US 2019/0004078 A1 Jan. 3, 2019

(30) Foreign Application Priority Data
Dec. 15, 2015 (JP) .................................. 2015-243974

(51) Int. Cl.
*G01N 35/04* (2006.01)
*G01N 35/00* (2006.01)
(52) U.S. Cl.
CPC ....... *G01N 35/04* (2013.01); *G01N 35/00732* (2013.01); *G01N 2035/00752* (2013.01); *G01N 2035/0496* (2013.01)
(58) Field of Classification Search
None
See application file for complete search history.

(56) References Cited

U.S. PATENT DOCUMENTS 7,392,949 B2 * 7/2008 Itoh ........................ G01N 35/04
235/462.01
9,459,268 B2 * 10/2016 Bucher .................... B01L 9/06
(Continued)

FOREIGN PATENT DOCUMENTS

JP 07055815 A 3/1995
JP 2005075395 A 3/2005
(Continued)

OTHER PUBLICATIONS

European Patent Office, Extended European Search Report Issued in Application No. 16875556.9, dated Jul. 10, 2019, Germany, 12 pages.
(Continued)

*Primary Examiner* — Mark C Hageman
(74) *Attorney, Agent, or Firm* — Alleman Hall Creasman & Tuttle LLP

(57) ABSTRACT

The apparatus contains a driving unit having a driving source device and a driving shaft, and the driving shaft has a drive-side roller for rotating the object (specimen container). The driving shaft is provided with a one-directional transmission device containing a mechanism for transmitting only rotational driving force in the first direction of the driving shaft to a driven-side part. The apparatus has a mechanism for converting a rotational driving force in the first direction to move a driving unit in a direction away from the object or a mechanism for converting a rotational driving force in the first direction to move a driven unit in a direction away from the object, and the rotational driving force in the second direction of the driving shaft rotates the object.

12 Claims, 11 Drawing Sheets

(56) References Cited

U.S. PATENT DOCUMENTS

| | | | |
|---|---|---|---|
| 10,274,506 B2 * | 4/2019 | Noda | ................ G01F 23/2928 |
| 2005/0047966 A1 | 3/2005 | Itoh | |
| 2011/0174708 A1 | 7/2011 | Oota et al. | |
| 2014/0212248 A1 | 7/2014 | Takai et al. | |
| 2018/0252737 A1 * | 9/2018 | Gemperle | ........ G01N 35/00732 |

FOREIGN PATENT DOCUMENTS

| | | | |
|---|---|---|---|
| JP | 2005321306 A | 11/2005 |
| JP | 2006052995 A | 2/2006 |
| JP | 2014149162 A | 8/2014 |
| WO | 2010038852 A1 | 8/2010 |

OTHER PUBLICATIONS

Japanese Decision to Grant a Patent, Application No. 2017-556029, dated Jun. 30, 2020, 12 Pages.

* cited by examiner

DEVICE FOR ROTATING OBJECT

TECHNICAL FIELD

The present invention relates to an apparatus for rotating an object.

BACKGROUND ART

In an analysis system configured to automatically analyze specimens, a specimen container containing the specimen to be analyzed is set at a predetermined position, the specimen is automatically taken out from the specimen container (for example, sucked out by a sampling nozzle or the like), and analysis processing is automatically performed in the analyzing part. The sample container has a prescribed length and thickness to be adaptable to various handling mechanisms in the analysis system.

As the aforementioned specimen container, a test tube-like cylindrical container body 101 with an opening sealed with a cap 102, such as a specimen container (more specifically, blood collection tube) 100 exemplified in FIG. 7, can be mentioned. A label 103 indicating a bar code 104 and the like for identifying the contained specimen is generally attached to the outer surface of the body of each specimen container.

In an analyzing system handling a number of specimen containers mentioned above and automatically and successively analyzing specimens contained in respective specimen containers, a carrying holder (also called "carrying rack") 200 shown in FIG. 7 is used. The carrying holder 200 has holding holes for holding specimen containers (100, 110, 120 . . . ), and the holding holes in a typical example are disposed in a row at given intervals. The carrying holder 200 is conveyed to a given position by various conveying apparatuses 300 such as a belt conveyor and the like.

Generally, a notch 210 is provided on the side wall of each holding hole of the carrying holder, and each holding hole communicates with the outside world through the notch 210 on the side of the holder. Therefore, as in the case of the specimen container 100 shown in FIG. 7, the barcodes 104 on the label 103 attached to the specimen container can be read through the notch 210 of the holding hole. The bar code on each label (113, 123) of other specimen containers (110, 120) can be similarly read through a notch of each holding hole. Transfer of specimen containers using such carrying holder is described in detail in patent document 1 and the like.

However, as shown in FIG. 7, since each specimen container is randomly inserted into a holding hole, the position of the label (103, 113, 123, . . . ) on each specimen container (position in the outer circumference direction of the body of each container). That is, the position of the bar code indicated in each label does not necessarily match the position of the notch 210. Therefore, for the bar code in the label to be read through the notch 210, each specimen container needs to be rotated about the central axis (in FIG. 7, central axis Y10 added to specimen container 110 as example) of each specimen container to match the position of the bar code in the label with the position of the notch 210 of the holding hole.

Various mechanisms for rotating the specimen container held by the carrying holder in order to read the bar code have been proposed. Among them, as a mechanism for preferably rotating only the target specimen container even when the specimen containers are close to each other, the mechanism using three gripping rollers described in the aforementioned patent document 1 can be mentioned. In this mechanism, as schematically shown in FIG. 8, three shafts 401, 402, 403 have gripping rollers 411, 412, 413 at respective tips, and these three gripping rollers grip one specimen container 100 at three positions of the body outer circumference. Shaft 401, which is one of the three shafts 401, 402, 403, is a driving shaft connected to a rotational driving source. Due to the rotation accompanying the rotational driving force of the driving shaft, the specimen container 100 rotates in the opposite direction via the gripping roller (drive-side roller) 411 at the tip. The remaining shafts 402, 403 are driven shafts, and gripping rollers (driven-side rollers) 412, 413 at each tip are constituted to idle. Therefore, gripping rollers 412, 413 can rotate in a driven manner according to the rotation of the specimen container 100 while gripping the specimen container 100.

In the aforementioned mechanism using three gripping rollers, even when specimen containers are close to each other, the object specimen container can be rotated by rotation of the drive-side roller on the spot, and each gripping roller does not contact the neighboring specimen container.

DOCUMENT LIST

Patent Document

Patent document 1: JP-A-2014-149162

SUMMARY OF THE INVENTION

Problems to be Solved by the Invention

However, a conventional rotation apparatus using three gripping rollers as mentioned above requires at least two independent driving source devices to perform an open/close operation to grip a specimen container, and a rotational motion to rotate a specimen container. The two driving source devices refer to a driving source device to achieve parallel transition of the two driven-side rollers 412, 413 in the direction of the double-headed arrow in order to grip and release the specimen container 100, and a driving source device for applying rotational driving force to the drive-side roller 411.

Therefore, a conventional rotation apparatus as mentioned above requires at least two driving source devices, thus making it difficult to make the whole apparatus more compact. Such problem similarly occurs not only when gripping and rotating a specimen container but also when contacting a drive-side roller with various objects and rotating same for various purposes.

The problem of the present invention is to provide an apparatus capable of achieving a moving operation to grip the object and a rotational motion to rotate the object by a common driving source device.

Means of Solving the Problems

The main constitution of the present invention is as follows.

[1] An apparatus for rotating an object, comprising at least a supporting member, a driving unit and a propulsive force applying device, wherein
the driving unit comprises a driving shaft and a driving source device for rotating the driving shaft in two way directions of a first direction and a second direction and the driving shaft comprises a drive-side roller for transmitting a rotational motion to the object upon contact with the object, the driving shaft is provided with a one-directional transmission device, the one-directional transmission device comprises a driving-side part and a driven-side part, the driving shaft is fixed to the driving-side part or integrated with the driving-side part, and the one-directional transmission device comprises a mechanism for transmitting only a rotational driving force in the first direction of the driving shaft to the driven-side part, and wherein the apparatus comprises a mechanism for converting the rotational driving force in the first direction to be transmitted to the driven-side part of the one-directional transmission device and moving the driving unit in a direction away from the object, or a mechanism for converting the rotational driving force in the first direction to be transmitted to the driven-side part of the one-directional transmission device and moving a driven unit in a direction away from the object, and the driven unit comprises a driven-side member gripping the object rotatably in cooperation with the drive-side roller, and the drive-side roller is rotated to transmit rotational motion to the object by the rotational driving force in the second direction of the driving shaft.

[2] The apparatus according to [1] comprising the mechanism for converting the rotational driving force in the first direction and moving the driving unit in a direction away from the object, wherein the driving unit is movably mounted on the supporting member such that the drive-side roller moves on a moving path comprising a contact position at which the drive-side roller contacts the object and a spaced position at which the drive-side roller is away from the object, the propulsive force applying device is provided between the driving unit and the supporting member such that a forward directional force that moves the drive-side roller in the direction of the contact position and contacts the drive-side roller with the object is applied to the drive-side roller, and the driven-side part of the one-directional transmission device is provided with a pinion member, the supporting member is provided with a rack member mating with the pinion member, the rotational driving force in the first direction is transmitted to the pinion member via the one-directional transmission device, the pinion member moves on the rack member in a backward direction opposite from the forward direction and against the forward directional force applied by the propulsive force applying device, whereby the driving unit moves in the backward direction.

[3] The apparatus according to [2], further comprising a driven-side member, said driven-side member being a member for gripping the object rotatably in cooperation with the drive-side roller when the drive-side roller contacts the object in a manner permitting rotation of the object.

[4] The apparatus according to [3] comprising the driven unit, wherein the driven unit comprises the driven-side member and is movably retained on the supporting member, a second rack member extends from the driving unit, a third rack member extends from the driven unit, the second rack member and the third rack member, with their respective teeth facing each other, are mating with a second pinion member rotatably supported between them, and the second rack member, the third rack member and the second pinion member are relationally assembled such that a movement of the driving unit in one direction causes a movement of the driven unit in the opposite direction, and the drive-side roller and the driven-side member simultaneously approach and grip the object and simultaneously leave and release the object.

[5] The apparatus according to [3] comprising the driven unit, wherein the driven unit comprises the driven-side member and is movably retained on the supporting member, the supporting member is provided with a pair of pulley members, an endless belt member is set around the pair of pulley members, and the endless belt member comprises a pair of straight segments extending in parallel with the forward direction and moving in the opposite direction with each other, of the pair of the straight segments, the driving unit is fixed on one straight segment and the driven unit is fixed on the other straight segment, whereby a movement of the driving unit in one direction causes a movement of the driven unit in the opposite direction via the endless belt member, thus the drive-side roller and the driven-side member simultaneously approach and grip the object and simultaneously leave and release the object.

[6] The apparatus according to [4] or [5], wherein a second propulsive force applying device is provided between the driven unit and the supporting member such that a force in a grip direction is applied to the driven-side member.

[7] The apparatus according to [1] comprising the mechanism for converting the rotational driving force in the first direction and moving a driven unit further-provided in a direction away from the object, wherein the driven unit is movably mounted on the supporting member such that the driven-side member moves on a moving path comprising a contact position at which the driven-side roller contacts the object and a spaced position at which the drive-side roller is away from the object, the propulsive force applying device is provided between the driven unit and the supporting member such that a forward directional force that moves the driven-side member in the direction of the contact position and contacts the driven-side member with the object is applied to the driven-side member, and the driven-side part of the one-directional transmission device is provided with a first pulley member, the supporting member is provided with a second pulley member, an endless belt member is set around the first pulley member and the second pulley member, and the endless belt member comprises a straight segment that moves in a backward direction opposite to the forward direction when the first pulley member rotates in the first direction, the driven unit is fixed on the straight segment, the rotational driving force in the first direction is transmitted to the first pulley member via the one-directional transmission device, the straight segment moves in a backward direction against the forward directional force applied by the propulsive force applying device, whereby the driven unit moves in the backward direction.

[8] The apparatus according to any of [3]-[7], wherein the driven-side member are two driven-side rollers gripping the object rotatably at three points in cooperation with the drive-side roller.

[9] The apparatus according to any of [1]-[8], wherein a second one-directional transmission device is interposed between the driving shaft and the drive-side roller, and the second one-directional transmission device is a device for transmitting only the rotational driving force in the second direction of the driving shaft to the drive-side roller.

[10] The apparatus according to any of [1]-[9], wherein the driving source device is a motor controllable to rotate in two way directions.

Effect of the Invention

According to the apparatus of the present invention, the number of driving source devices can be reduced as compared to the conventional apparatuses, the whole apparatus can be made compact, and the cost of the whole apparatus can be reduced.

In a preferable embodiment of the present invention, moreover, the drive-side roller can leave the object without rotating the object. This makes it possible to maintain the position of the object rotated initially.

BRIEF DESCRIPTION OF THE DRAWINGS

FIG. 1-2 schematically shows the constitution of the main part in the second embodiment of the apparatus of the present invention. In this Figure, to show that the endless belt member is cyclic, the endless belt member is drawn as an oblong and the both ends of the endless belt member are respectively drawn away from the first and second pulley members. Actually, the both ends of the endless belt member are in contact with the first and second pulley members, and an appropriate tension is imparted to the endless belt member.

FIG. 2 is a perspective view showing the constitution of the main part of the apparatus and the positional relationship between the apparatus and the specimen container in the first embodiment of the present invention, when the apparatus is seen obliquely from the upper side. In this Figure, all the gears (including the pinion member) and the crests and roots teeth rack member are not shown. The same also applies to the following FIG. 3, FIG. 4-1 and FIG. 5.

In FIG. 3, two driven-side rollers as the driven-side member, the whole constitution of the driving unit, specific examples of accessory structures such as the supporting member and the like are shown. The illustration of the structure of the driven side is omitted, and a moving mechanism and a spring (propulsive force applying device) provided on the support member are shown.

FIG. 4-1 is a front view showing the constitution of the main part of the apparatus in the first embodiment of the present invention, and a constitution example in which the drive unit and the driven unit are movably disposed on the supporting member is shown.

FIG. 4-2 is a schematic drawing showing other mechanism for mutually moving the driving unit and the driven unit in the first embodiment of the present invention.

DESCRIPTION OF EMBODIMENTS

Figure 7:
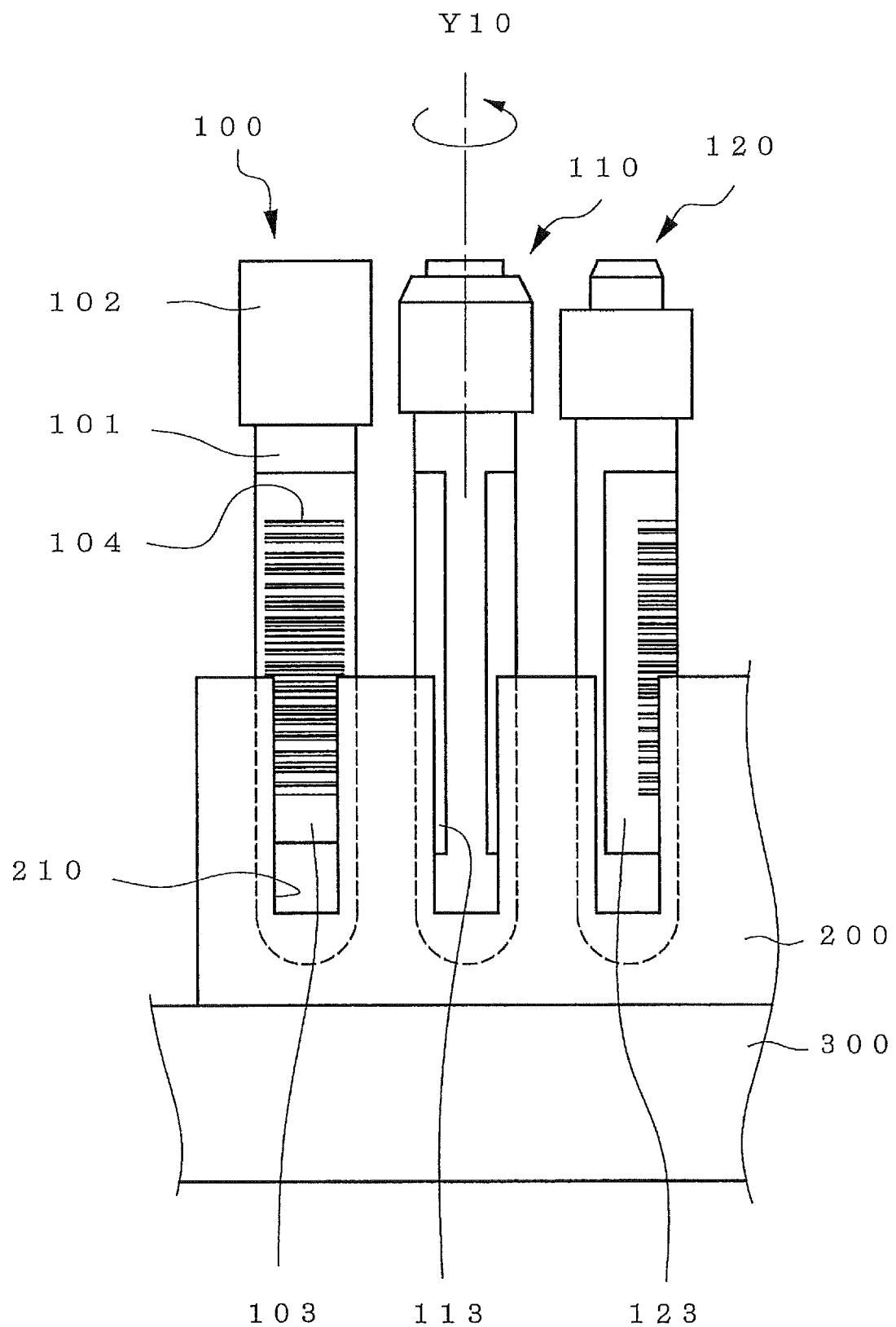
FIG. 7 shows one embodiment of a conventional specimen container and a carrying holder retaining many specimen containers.

The constitution of the apparatus of the present invention (apparatus for rotating an object) is explained in detail below by referring to specific Examples. In the Figures for explanation, as an example of the object to be rotated, a specimen container as shown in FIG. 7 is shown. In the following explanation, the respective numerical values and materials cited as one embodiment of preferable examples and do not limit the present invention.

Figure 1:
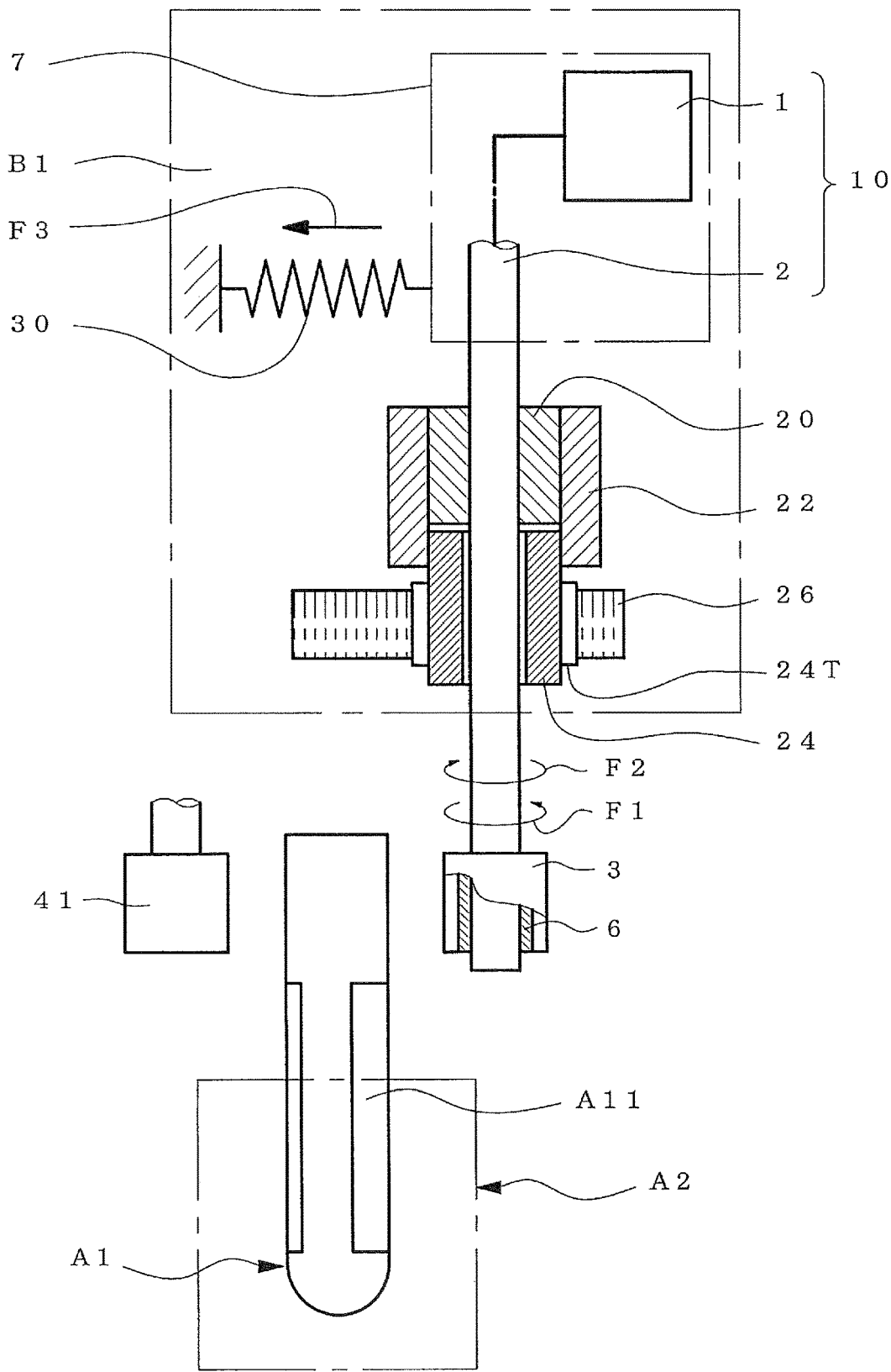
FIG. 1-1 schematically shows the constitution of the main part in the first embodiment of the apparatus of the present invention. In this Figure, for the sake of explanation, only a one-way clutch 20, a pinion member 24 and a tubular connector 22 connecting them are shown in sectional views, and hatching is applied. In the embodiment of this Figure, a rack member 26 and a pinion member 24 are a rack and a pinion, and the cross-section of teeth 24T on the outer circumference of the pinion is not shown. Teeth of a rack 26 mating with the pinion 24 are not drawn, and a parallel stripe alternate long and short dash line indicates the teeth of the rack.
Figures 1, 2:
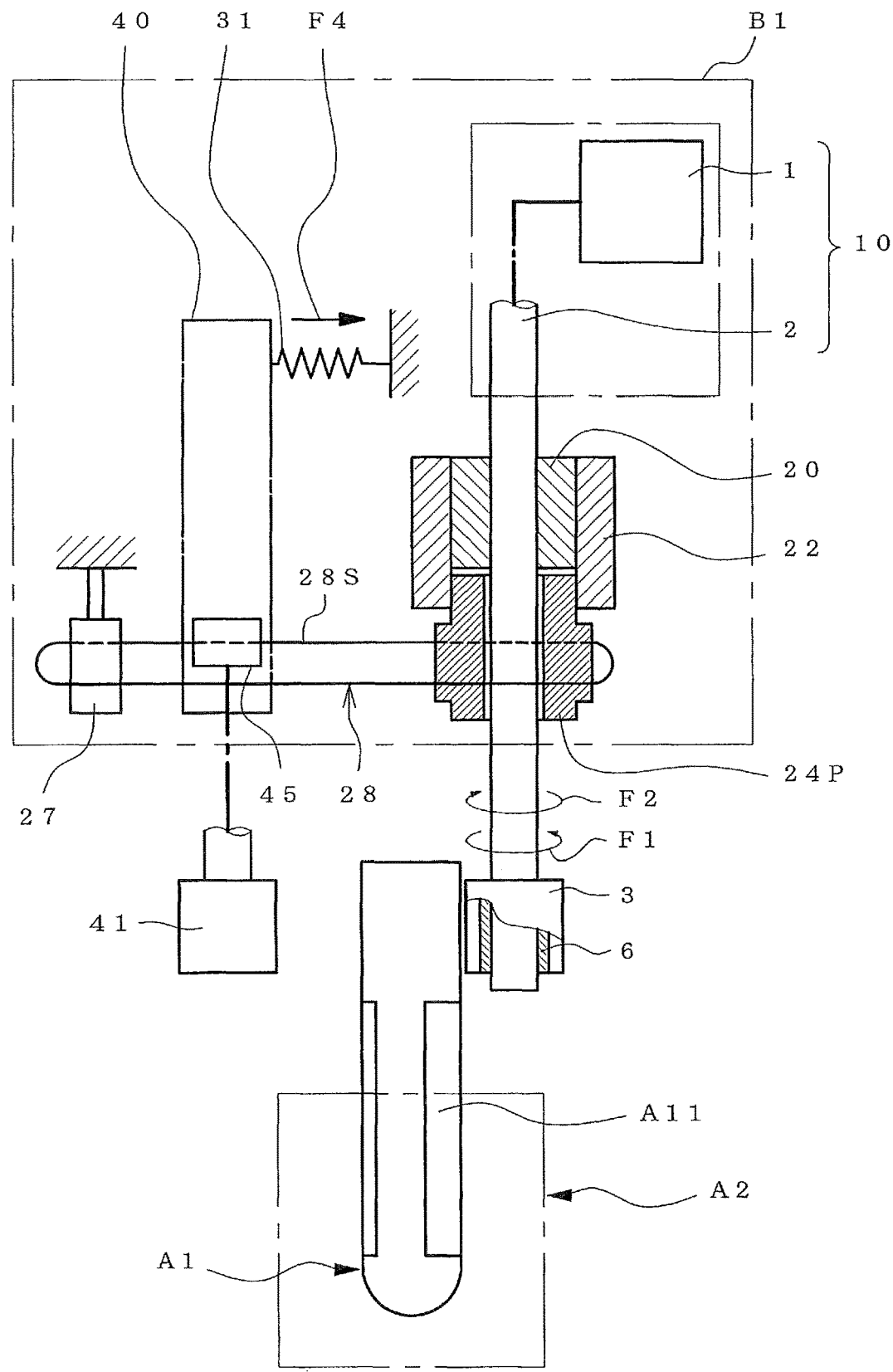
Figure 2:
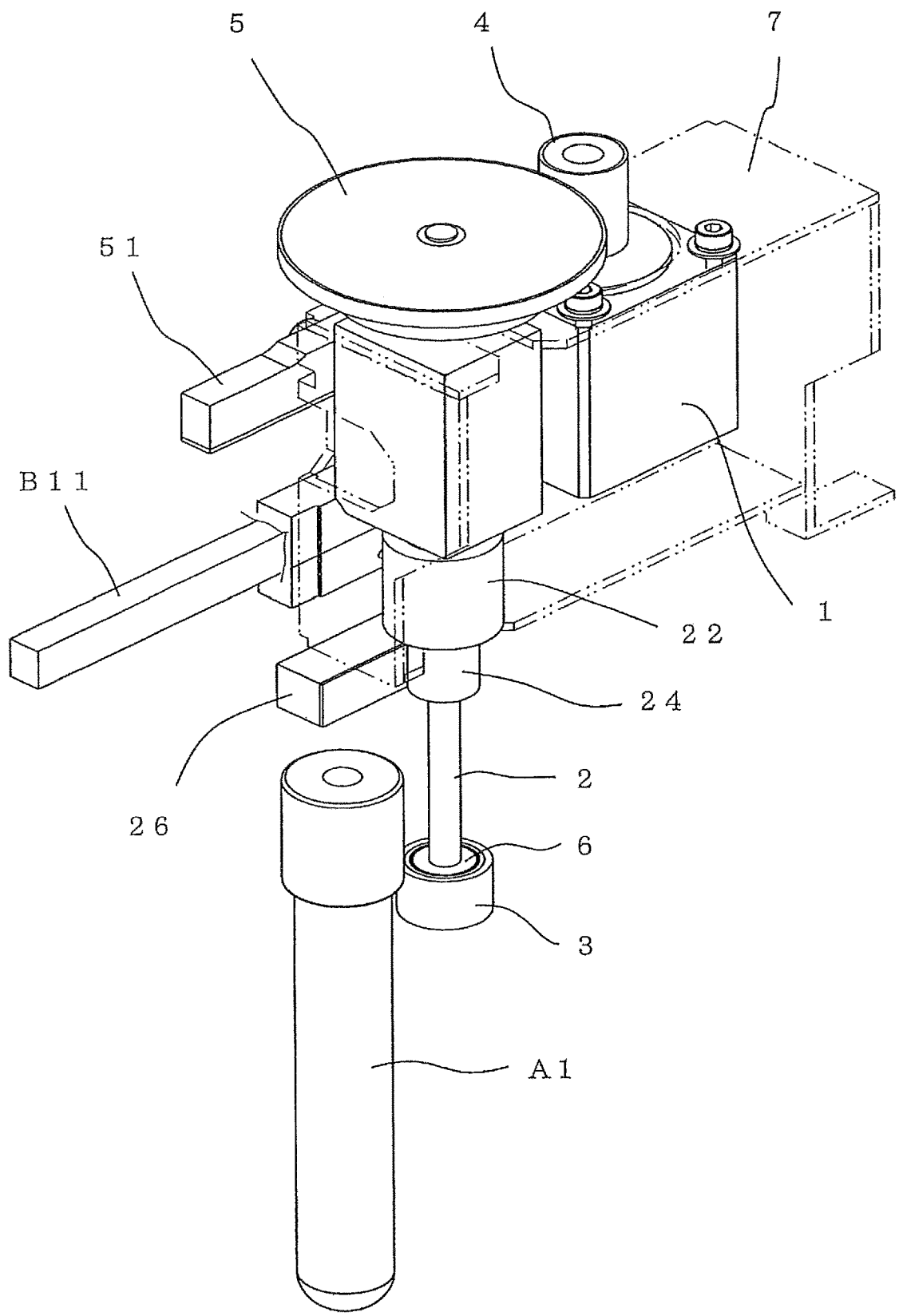

As shown in the constitution of the main part in the embodiment of the present invention in FIG. 1-1 and FIG. 1-2, the apparatus is constituted of at least a supporting member B1, a driving unit 10, and a propulsive force applying device 30 (or 31). The driving unit 10 is constituted of at least one driving shaft 2 and at least one driving source device 1 that rotates the driving shaft 2 in a first direction and a second direction which are opposite directions to each other. In FIG. 1-1 and FIG. 1-2, the supporting member B1 for supporting the driving unit 10 as a whole and a bracket 7 which is also the frame of the driving unit 10 itself are indicated by alternate long and short dash lines. The driving shaft 2 has a drive-side roller 3 on the tip thereof. The drive-side roller 3 rotates together with the driving shaft 2, contacts a specimen container A1 held at a given position, and rotates the specimen container. Therefore, the contact is one accompanying a pushing force permitting the drive-side roller 3 to rotate the specimen container A1. It is preferable that the driving shaft 2 for rotating the specimen container and the rotation central axis of the drive-side roller 3 are parallel to the rotation central axis of the specimen container.

The first direction and the second direction may be rotational directions opposite to each other. In the embodiments of FIG. 1-1 and FIG. 1-2, the rotational driving force F1 of the first direction and the rotational driving force F2 of the second direction are each shown with an arrow. When viewing the side of the drive-side roller 3 on the tip from the side close to the driving source device along the rotation axis of the driving shaft, the first direction is a counter-clockwise rotation direction, and the second direction is a clockwise rotation direction. The first direction and the second direction shown in these Figures are directions defined for the sake of explanation and may each be an opposite direction.

As shown in FIG. 1-1 and FIG. 1-2, the apparatus uses one driving source device for rotating the object and also uses a mechanism using the below-mentioned one-directional transmission device (mechanism of the below-mentioned (I) or the below-mentioned (II)) to create an operation.

When the driving source device rotates in a particular direction (explained as the second direction in the embodiment), the drive-side roller 3 is rotated, by the rotational driving force F2 in a particular direction, to transmit the rotational motion to the specimen container A1 as the object. That is, the drive-side roller 3 transmits its rotation to the object to rotate the object.

When the driving source device rotates in a direction opposite to the particular direction (explained as the first direction in the embodiment), the rotational driving force F1 in the first direction is converted and the driving unit including the drive-side roller is moved in a direction away from the object to release the gripping, or the driven unit including the below-mentioned driven-side member is moved in a direction away from the object to release the gripping.

(I) Mechanism in which the rotational driving force in the first direction transmitted to the driven-side part of the one-directional transmission device is converted and the driving unit is moved in a direction away from the object.

(II) Mechanism in which the rotational driving force in the first direction transmitted to the driven-side part of the one-directional transmission device is converted and the below-mentioned driven unit is moved in a direction away from the object.

The mechanisms of (I) and (II) both include a motion converting mechanism for converting the rotational motion in the first direction transmitted to the driven-side part of the one-directional transmission device into a translational motion. By combining the one-directional transmission device and the motion converting mechanism, it is possible to rotate the object even when using one driving source device and to move the drive-side roller or the driven-side part away from the object (upon which the object is exchanged for the next object).

First, the first embodiment of the present invention is explained by referring to FIG. 1-1.

In the first embodiment of the present invention, the apparatus comprises the mechanism for converting rotational driving force in the first direction to move the driving unit in a direction away from the object, and the driving unit is movably constituted. As said mechanism, the following constitution is exemplified.

As shown in FIG. 1-1, driving unit 10 is movably attached on the supporting member B1 to move on a moving path containing a contact position at which the drive-side roller 3 contacts the specimen container (object) A1 and a spaced position at which the drive-side roller is away from the specimen container. The structure enabling this movement is described later. A propulsive force applying device (extension spring in this embodiment) 30 is provided between the driving unit 10 and the supporting member B1 such that a forward directional force (propulsive force) F3 that moves the drive-side roller 3 to the contact position and contacts same with the object is applied to the drive-side roller. One end of the propulsive force applying device 30 is fixed at any appropriate position of the driving unit 10 and the other end of the propulsive force applying device 30 is fixed at any appropriate position of the supporting member B1.

A one-directional transmission device 20 is provided on the driving shaft 2. The one-directional transmission device 20 comprises, as detailedly explained below, a driving-side part attached to the driving shaft 2 or integral with the driving shaft 2 and a driven-side part positioned outside thereof, and has a mechanism for transmitting only the rotational driving force F1 in the first direction of the driving shaft 2 to the driven-side part by the internal mechanism between the driving-side part and the driven-side part. In this embodiment, the below-mentioned one-way clutch is used as the one-directional transmission device 20. The driven-side part of the one-directional transmission device 20 is provided with a pinion member 24 and, on the other hand, a rack member 26 mating with the pinion member 24 is provided on the aforementioned supporting member B1, and the pinion member 24 and the rack member 26 are engaged with each other. The pinion member and the rack member may be any combination as long as it converts rotational motion into linear motion. In this embodiment, the combination is pinion (circular-shaped gear) and rack (linear gear). The pinion member and rack member are described below.

The pinion member 24 receives the rotational driving force F1 in the first direction transmitted via the one-directional transmission device 20 and rotates. The pinion member moves on the rack member 26 in a backward direction opposite from the forward direction and against the forward directional force applied by the propulsive force applying device 30. By the movement of the pinion member 24, the drive-side roller 3 (i.e., whole driving unit) moves in the backward direction.

What is important here is that the aforementioned one-directional transmission device 20 is interposed between the driving shaft 2 and the pinion member 24, whereby only the rotational driving force F1 in the first direction of the driving shaft 2 is transmitted to the pinion member. As a result, the following operations (i) and (ii) are obtained.

(i) When the driving shaft 2 rotates in the first direction, the pinion member 24 receives the rotational driving force F1 in the first direction and moves in the backward direction, whereby the drive-side roller 3 moves to the spaced position.

(ii) When the driving shaft 2 rotates in the second direction, the rotational driving force F2 in the second direction is not transmitted to the pinion member 24, and the pinion member 24 idles with respect to the drive shaft 2. Therefore, the pinion member 24 cannot resist the forward directional force F3 in the forward direction by the propulsive force applying unit 30, moves in the forward direction according to the force F3, and therefore, the drive-side roller 3 also moves in the forward direction and reaches the contact position. At the contact position, moreover, the drive-side roller 3 receives the rotational driving force F2 of the driving shaft 2 and rotates in the second direction to rotate the specimen container A1.

As described above, by the single common drive source device, the traveling of the drive-side roller 3 and the operation of rotating the object are achieved.

Here, the principle by which the traveling of the drive-side roller 3 and the operation of rotating the object can be achieved by the common driving source device is described in more detail. In the present invention, rotating the object (specimen container) means, as described in the explanation of the Background Art, rotating the object about the central axis of the object (e.g., central axis Y10 of specimen container 110 shown in FIG. 7). Here, only the aforementioned rotational motion and traveling operation applied to the drive-side roller 3 are described. The specimen container A1 can rotate when the drive-side roller 3 merely contacts the specimen container A1 and rotates with an appropriate contacting force (pushing force). However, to rotate the specimen container A1, it is more preferable to rotate the specimen container A1 while holding A1 by the drive-side roller 3 and the below-mentioned driven-side member. The driven-side member is described below.

A preferable traveling operation of the drive-side roller 3 is, as shown in FIG. 1-1, a traveling operation in which a rotation central axis (not shown) of the drive-side roller 3 approaches in parallel with the rotation central axis (not shown) of the specimen container A1 held at a given position, the roller contacts A1, and leaves therefrom. In the following, the movement to the contact position is also referred to as a "forward movement", and the movement to the spaced position is also referred to as a "backward movement". To enable such movement operation, the driving unit (device of the driving line having at least driving source device 1 and driving shaft 2) 10 is movably retained relative to the supporting member B1.

As a driving force for moving the driving unit 10 retained movably as mentioned above, a rotational driving force of the driving shaft is utilized in the present invention as shown in the embodiments. A pinion member 24 is mounted on the driving shaft 2 and a rack member 26 mating with the pinion member 24 is fixed on the supporting member B1 to convert the rotational driving force into the driving force for linear movement. As mentioned above, the one-directional transmission device is interposed between the driving shaft 2 and the pinion member 24. For explanation of the operation, a case not involving a one-directional transmission device is first explained.

When the pinion member 24 is directly fixed to the driving shaft 2, the pinion member 24 moves on the rack member according to the rotation of the driving shaft 2. When the pinion member 24 moves forward or backward, the driving unit 10, the driving shaft 2 and the drive-side roller 3 also move similar to the pinion member 24. However, in such constitution, when the drive-side roller 3 is rotated to rotate the specimen container A1 while the drive-side roller 3 is in contact with the specimen container A1, the pinion member 24 also rotates in conjunction. Thus, the drive-side roller 3 comes to further advance in a direction to bite into the specimen container or comes to separate from the specimen container. In a constitution without a one-directional transmission device, the specimen container cannot be rotated preferably.

In the present invention, therefore, as shown in the embodiment of FIG. 1-1, the one-directional transmission device 20 was further added between the driving shaft 2 and the pinion member 24, and only the rotational driving force F1 in the first direction for moving backward the drive-side roller 3 out of the rotational driving forces (F1, F2) in two way directions of the driving shaft 2 is transmitted to the pinion member 24. Therefore, the rotation of the drive shaft 2 in the first direction moves the drive-side roller 3 backward. On the other hand, when the driving shaft 2 rotates in the second direction which is the opposite direction, the rotational driving force F2 in the second direction is not transmitted to the pinion member 24 due to the action of the one-directional transmission device 20. That is, the rotation of the drive shaft 2 in the second direction cannot move the drive-side roller 3 forward.

In the present invention, as shown in the first embodiment, to apply a forward directional force (gripping force when driven-side member is present) F3 that moves the drive-side roller 3 forward and contacts same with the specimen container, a propulsive force applying device 30 is disposed. The forward directional force (returning force of spring when propulsive force applying device is spring, the forward directional force is hereinafter to be also referred to as propulsive force) F3 imparted by the propulsive force applying device 30 acts as a force move forward the driving unit 10.

As described above, when the driving shaft 2 is rotated in the first direction by the constitution added with the one-directional transmission device 20 and propulsive force F3 imparted by the propulsive force applying device 30, the rotational driving force F1 is transmitted to the pinion member 24 by the one-directional transmission device 20. Thus, the pinion member 24 mates with the rack member 26 and moves backward against the propulsive force F3 of the propulsive force applying device 30. Therefore, the drive-side roller 3 also moves backward and disengages from the specimen container A1.

On the other hand, when the driving shaft 2 rotates in the second direction, the rotational driving force F2 in the second direction is not transmitted to the pinion member 24 by the action of the one-directional transmission device. Thus, the drive-side roller 3 moves forward only by the propulsive force (spring returning force in FIG. 1-1) F3 of the propulsive force applying device 30, and the drive-side roller 3 reaches the contact position determined by the outside diameter of the specimen container and is pushed against the specimen container A1 by the propulsive force F3 of the propulsive force applying device. In this state, the specimen container A1 receives the rotational driving force F2 in the second direction from the drive-side roller 3 and rotates.

Even if the propulsive force F3 of the propulsive force applying device 30 acts, the driving unit 10 cannot always move forward unlimitedly at a high speed. When the driving shaft 2 rotates in the second direction and the pinion member 24 moves forward by the propulsive force F3 of the propulsive force applying device 30, the rotating speed of the pinion member 24 in the second direction cannot exceed the rotating speed of the driving shaft 2 in the second direction. This is because when the rotating speed of the pinion member in the second direction exceeds the rotating speed of the driving shaft 2 in the second direction, the driving shaft 2 relatively rotates in the first direction, and the driving force transmission action of the one-directional transmission device 20 is activated. Therefore, the rotating speed of the driving shaft 2 in the second direction is the upper limit of the rotating speed of the pinion member in the second direction, and the forward moving speed of the drive-side roller 3 can be controlled by controlling the rotating speed of the driving shaft 2 in the second direction.

When the propulsive force applying device 30 is an elastic member such as spring, the propulsive force (returning force) F3 thereof change according to the position of the drive-side roller 3, and the returning force F3 at the contact position is a contacting force (pushing force or gripping force). In a state in which the drive-side roller 3 is pressed against the specimen container A1 by the propulsive force F3, the driving shaft 2 can continue to rotate in the second direction (direction of F2) together with the drive-side roller 3 without rotating the pinion member 24 (i.e., without moving from the site). Therefore, the specimen container A1 preferably follows the drive-side roller 3 and rotates in a direction opposite to the second direction.

As mentioned above, as shown in the first embodiment, in the present invention, the common driving source device, the one-directional transmission device, the rack member 26, the pinion member 24, and the propulsive force applying device 30 are skillfully combined to impart the moving operation to contact the drive-side roller 3 with the specimen container A1 (forward moving and contact by the propulsive force of the propulsive force applying device), a moving operation to be away from the specimen container (backward moving by the rotational driving force F1 of the first direction), and a rotational motion for rotating the specimen container (rotation by the rotational driving force F2 of the second direction) to the drive-side roller 3.

The driving source device 1 may be a device capable of rotating the driving shaft 2 in two way directions. The driving source device 1 may contain a transmitting device, linkage, joint and the like as necessary to rotate the driving shaft 2 in two way directions. When the driving source part of the driving source device 1 is an actuator for outputting linear reciprocating movements, a transmit mechanism for converting the reciprocating movement into a rotational motion only needs to be contained. In FIG. 1-1, FIG. 1-2, the thick alternate long and short dash lines connecting the driving source device 1 and the driving shaft 2 mean that a necessary transmitting device (various gears, joints and the like) may be further contained between them. The rotation into two way directions may be created by a transmitting device.

The driving source device 1 is preferably a device that develops and outputs rotational driving force, and more preferably an electric motor that can control the rotation amount and the rotation speed in the two way directions. Examples of such electric motor include stepping motor, servo motor, and the like. The driving source device 1 may directly drive the driving shaft 2.

In the embodiments of FIG. 1-1, FIG. 1-2, FIG. 2-FIG. 5, the apparatus is configured as an apparatus that rotates the specimen container A1 to a fixed position in order to read the print on the label (in particular the bar code). The high rotation speed of the output shaft of the motor serving as the driving source device 1 is transmitted from the small gear 4 to the large gear 5 and is reduced to a preferable rotating speed for rotating the specimen container A1 by the drive-side roller 3. Instead of the aforementioned transmitting device using the small gear 4 and the large gear 5, a transmitting device including a belt and large and small pulleys (preferably, a toothed belt (timing belt) and a toothed pulley may also be used. By the transmitting device, the rotational driving force F1 that moves backward against the propulsive force F3 of the propulsive force applying device 30 and the preferable rotational driving force F2 for rotating the specimen container A1 are transmitted to the driving shaft 2.

Figure 3:
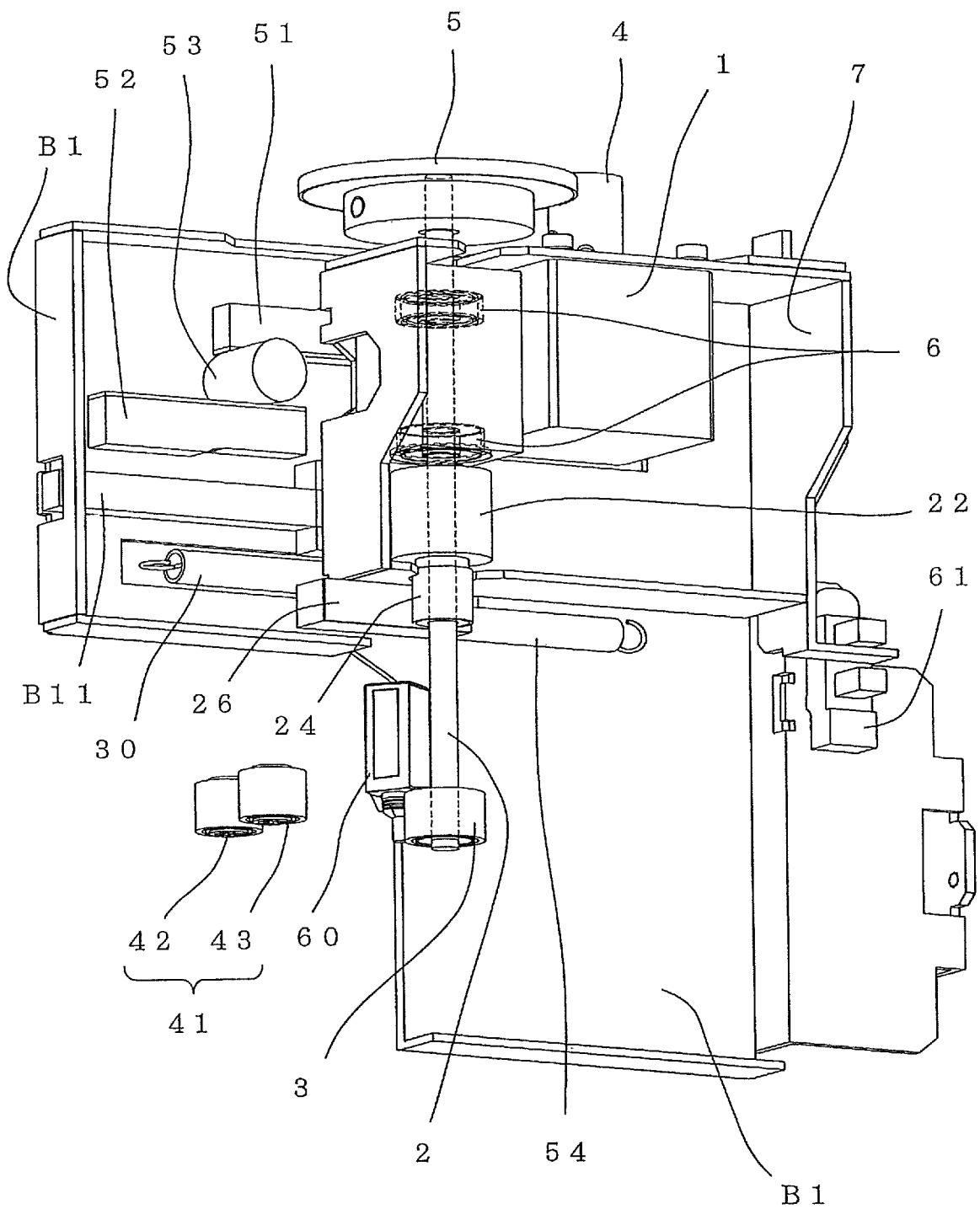
FIG. 3 is a perspective view showing the constitution of the main part of the apparatus in the first embodiment of the present invention, when the apparatus is seen obliquely from the lower side.

As mentioned above, in a preferable embodiment, as shown in FIG. 3, the output shaft of the motor serving as the driving source device 1 is in the vertical direction, the driving shaft 2 is retained parallel to the output shaft by the bearing device 6, and the whole driving unit is constituted compact. The positional relation between the driving source device 1 and the driving shaft 2 is not particularly limited, and the output shaft and driving shaft 2 of the driving source device 1 may be directly connected such that their respective rotation center axes are aligned with each other or may be connected to form an angle.

As the driving shaft, one having a mechanical strength enduring pressing on the specimen container and capable of transmitting the rotational driving force can be used. The material of the driving shaft may be, for example, a plastic or metal material for machine structures. The transverse sectional shape of the driving shaft may be a circular shape, polygon and the like, and may be hollow or solid. In a preferable embodiment, the main part of the driving shaft is a solid rod with a circular transverse sectional shape. The cross-sectional shape of the driving shaft may change as necessary, such as when binding with other members, etc. and may not have a uniform cross-sectional shape over the entire length.

The drive-side roller is coaxially fixed at the tip of the driving shaft so that it can be rotated with the driving shaft. In the below-mentioned preferable embodiment, a second one-directional transmission device is inserted in between the driving shaft and the drive-side roller. When the driving shaft rotates in the first direction (moves backward), the rotation of the driving shaft 2 is constituted to prevent transmission to the drive-side roller.

The drive-side roller is preferably a layer made of an elastic and flexible material so that at least its surface layer may be pressed against the specimen container without breaking same and contact the specimen container without sliding or idling. Examples of the material of the surface layer include natural rubber, silicone rubber, other synthetic rubber, elastic and flexible synthetic resin such as urethane rubber and the like, and the like, and an elastic and flexible organic polymer material is preferable.

The outside diameter and length and thickness of the surface layer of the drive-side roller are not particularly limited, and may be determined as appropriate taking into consideration the contact property with the specimen container, the rotating speed of the specimen container determined according to the body outer diameter of the specimen container and the like.

While the body outer diameter of the object is not particularly limited, when the object is a specimen container, the outside diameter of the specimen container widely used is about 10 mm-15 mm, particularly about 11.5 mm-13 mm. The outside diameter of the specimen container is not limited to the aforementioned range, and a specimen container having an outside diameter outside the above range may also be used.

The driving unit is movably mounted on the supporting member B1 of the device so that the drive-side roller 3 can travel on a moving path including the contact position (gripping position) and the spaced position (releasing position). In the embodiment of FIG. 1-1, the drive-side roller 3 is set at a spaced position (backward position). When the specimen container A1 is present, the drive-side roller 3 moves to a position stopped by the specimen container (contact position). When the specimen container is absent, it preferably moves to a given position beyond the contact position. In the embodiment of FIG. 1-1, from given position beyond the contact position to the spaced position is the overall length of the moving path, and a contact position defined by the body surface of the specimen container is included in the path.

The overall length of the moving path (moving distance of drive-side roller 3) is not particularly limited, and may be determined according to the outside diameter of the object (particularly, specimen container) and the like.

The moving path of the drive-side roller 3 and the stop position in the path can be set appropriately according to the requirements at the time of use. The moving path of the drive-side roller 3 is preferably a linear path from the viewpoint of simple formation of a moving mechanism, but may be a curved path.

In a preferable embodiment, as shown in FIG. 3, a set of elements of the drive system constituting the drive unit such as driving source device 1, transmitting gears 4, 5, driving shaft 2, drive-side roller 3, bearing device 6 and the like are assembled on the bracket 7 and the bracket 7 is movably mounted on the supporting member B1.

As shown in FIG. 1-1, FIG. 1-2, since the specimen container A1 is generally held in a state of standing on the carrying holder A2, the rotation central axis of the driving shaft 2 and the drive-side roller 3 is preferably also in the vertical direction. The embodiment of the supporting member for movably holding the drive unit is not particularly limited. The bracket and the supporting member to which the aforementioned driving unit is attached preferably also have a vertical surface. In the embodiments shown in FIG. 2, FIG. 3, FIG. 4-1, FIG. 5, the bracket 7 and the supporting member B1 are formed of a plate material having a vertical surface, and are subjected to bending and hole forming processing. The bracket 7 and the supporting member B1 may have rod-shaped or truss-shaped structures.

A structure for movably mounting the bracket 7 on the supporting member B1 is not particularly limited, and a conventionally-known moving mechanism can be adopted. Examples include sliding mechanism using key and keyway, shaft and bushing, various bearings for linear motion called slide unit and the like, and the like.

In FIG. 3, the key B11 fixed to the vertical surface of the supporting member B1 is shown by omitting the illustration of the driven unit 40 described later. The key B11 is used as a common key for moving the bracket 7 and moving the bracket of the driven unit.

The propulsive force applying device 30 is provided between the driving unit 10 and the supporting member B1. The propulsive force applying device 30 may be any as long as it can impart propulsive force to the driving unit, may be a single member or a single mechanical element, or a device of a combination of these. In addition, the propulsive force applying device 30 preferably continues to impart a propulsive force over the whole traveling range of the driving unit. The intensity of the propulsive force thereof is preferably such that the driving force of the driving unit overcomes the propulsive force when the driving unit moves backward and the driving unit successfully moves backward. The propulsive force may be a pulling force or a pushing force of the drive unit.

The propulsive force applying device 30 is not particularly limited, and examples include elastic body (rubber, spring), a piston and a cylinder that applies propulsive force using a fluid such as air as a working fluid, a member made of a shape-memory alloy that shows restoring force by heating and the like. In preferable embodiments shown in FIG. 1-1, and, FIG. 2-FIG. 5, the propulsive force applying device 30 is a spring and is set between the bracket 7 and the supporting member B1. The spring 30 is set in a shape deformed from the original shape, and the returning force F3 thereof is applied through the bracket 7 to the drive-side roller 3 to come into contact with the specimen container and further applies a force for pressing the specimen container.

The material of the spring may be rubber (natural rubber, synthetic rubber), organic polymer material having flexibility and elasticity, metal spring material such as stainless steel, steel, copper alloy and the like, and a metal spring material such as stainless steel are preferable materials. The form of the spring may be any bulk or linear known spring form (leaf spring, compression coil spring, extension coil spring and the like), and extension coil spring is a preferable embodiment. In the embodiment shown in the Figure, extension coil spring is used as the propulsive force applying device. As clearly shown in FIG. 3, FIG. 4-1, the extension coil spring 30 is mounted between the bracket 7 and the supporting member B1, and the pulling force F3 in the forward direction acts on the driving unit through the bracket 7 (the portion for engaging the extension coil spring 30 with the supporting member B1 is not shown).

The propulsive force F3 of the propulsive force applying device 30 in the spaced position is not particularly limited. A load that preferably moves the driving unit and is easily overcome by the rotational driving force F1 of the driving unit, whereby the driving unit can be maintained at the spaced position, is preferable. The propulsive force F3 of the propulsive force applying device in the contact position (i.e., pushing force acting on the specimen container from the drive-side roller 3, or gripping force) is not particularly limited, and a force with which a pushing force preferably rotating the specimen container acts on the specimen container is used.

As shown in FIG. 1-1, FIG. 2-FIG. 4-1, in the body outer circumference at the middle part of the driving shaft 2, the one-directional transmission device (commercially available one-way clutch in the Example) 20 is coaxially fixed with the driving shaft 2. The pinion member 24 is coaxially fixed with the driving shaft 2 on the driven side positioned on the outside of the one-directional transmission device 20. A rack member 26 mating with the pinion member 24 is fixed to the support member B1. By this constitution, when the pinion member 24 moves (forward and backward) on the rack member 26, the driving unit 10 also moves (forward and backward) with respect to the supporting member B1 according to the movement.

As mentioned above, the rack member and the pinion member can be used in a combination such that the rotational motion of the pinion member is converted into linear motion on the rack member, and rack and pinion, roller chain and sprocket, toothed belt (timing belt) and toothed pulley and the like can be mentioned. The pitch of the rack member and pinion member and the height of the tooth (gear module in the case of rack and pinion) may be appropriately determined in consideration of the rotating speed of the driving shaft and the size of the force to be transmitted.

The one-directional transmission device 20 is constituted such that only the rotational driving force F1 in the first direction of the driving shaft 2 is transmitted to the pinion member. The rotation direction of the driving shaft 2 and the moving direction of the pinion member 24 with respect to the rack member 26 are related to satisfy the following operations (A) and (B).

(A) When the driving shaft 2 rotates in the first direction, the rotational driving force F1 is transmitted to the pinion member 24, the pinion member 24 moves (moves backward) on the rack member 26 against the propulsive force (contacting force to the object) F3 of the propulsive force applying device 30, whereby the drive-side roller 3 moves to the release position.

(B) When the driving shaft 2 rotates in the second direction, the rotational driving force F2 is not transmitted to the pinion member 24, the pinion member 24 moves forward on the rack member according to the propulsive force F3 of the propulsive force applying device 30, whereby the drive-side roller 3 moves to the contact position, applies the contacting force (pushing force) F3 to the specimen container A1 as well as rotates the specimen container A1 by the rotational driving force F2 in the second direction transmitted from the driving shaft 2.

The one-directional transmission device is a rotational driving force transmitting device constituted to transmits only a rotational driving force in a certain one rotation direction and not transmit a rotational driving force in the opposite rotation direction. The prior art can be referred to for the transmission mechanism of the one-directional transmission device itself. Examples of the one-directional transmission device include ratchet mechanism, freewheel, one-way clutch, and the like. Commercially available apparatuses may be used, and those exclusively designed for the embodiment of the present invention may be used. In FIG. 1-1, illustration of selective power transmission mechanism inside the one-directional transmission device is omitted.

A one-directional transmission device utilizable for the present invention is, as shown in FIG. 1-1, FIG. 1-2, preferably one having a tubular shape to be mountable on the body of the driving shaft 2. In the embodiments of FIG. 1-1, FIG. 1-2 and FIG. 2-FIG. 5, one-way clutch having a cylindrical tubular shape is used as a preferable one-directional transmission device. The driving-side part of the one-way clutch is fixed to the body of the driving shaft 2 or integrated with the driving shaft, and a pinion member 24 is fixed to the outer circumference of the driven-side part on the outside via a connector 22.

Figure 6:
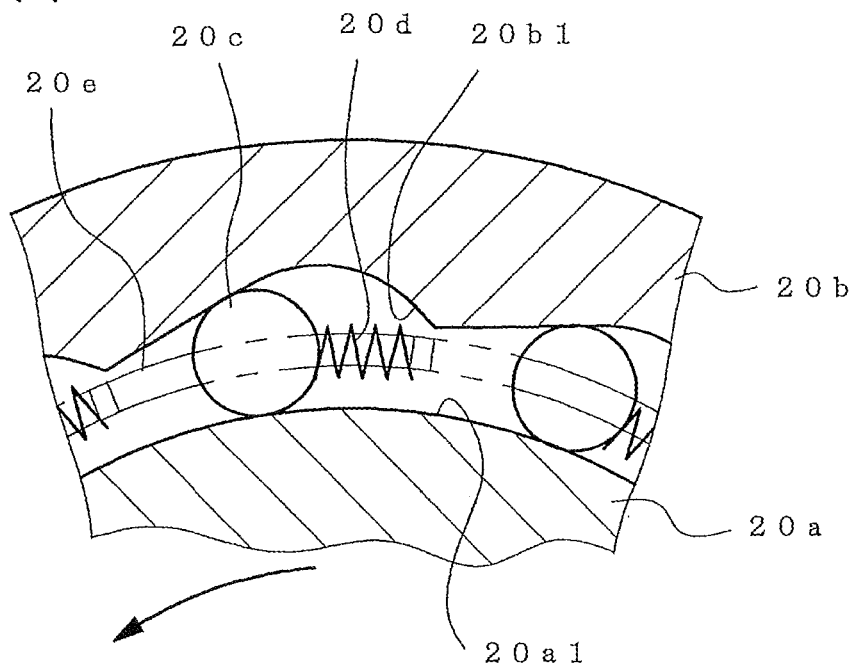
FIGS. 6(a) and 6(b) schematically show the principle of selective connection and separation of the one-way clutch used in the first and second embodiments of the present invention.
Figure 6:
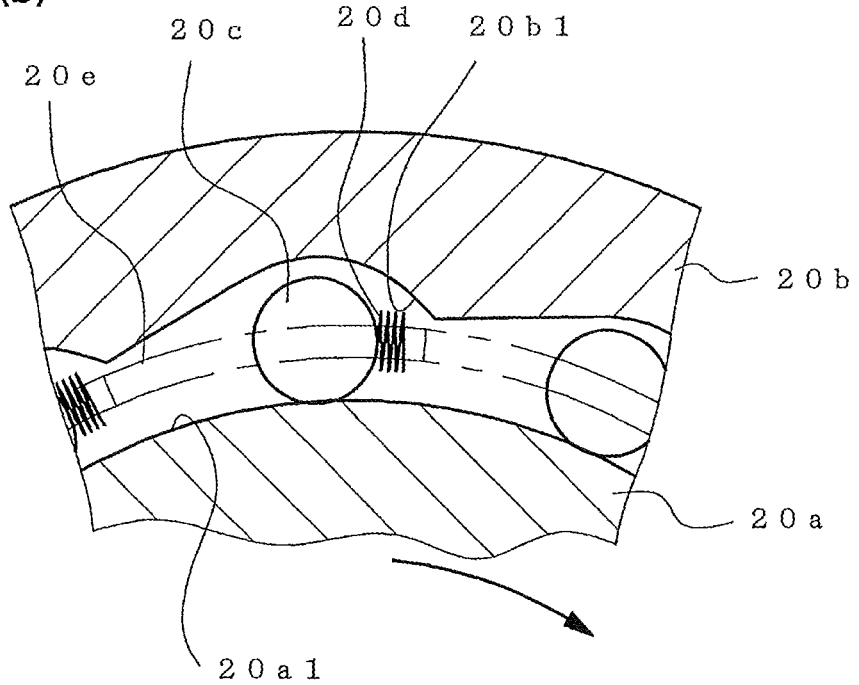

FIGS. 6(*a*) and 6(*b*) are Figures for explaining the principle of selective transmission of a one-way clutch which is a preferable one-directional transmission device. The structure shown in FIGS. 6(*a*) and 6(*b*) are merely an example for the purpose of explanation, and various internal transmission mechanisms have been developed.

As shown in FIGS. 6(*a*) and 6(*b*), the one-way clutch has a driving-side part 20*a*, a transmission mechanism part (20*c*, 20*d*, 20*e*) for selective transmission, and a driven-side part 20*b*. The driving-side part 20*a* and the driven-side part 20*b* are interchanged according to the position of the driving source. In the first embodiment and the second embodiment, the driving-side part 20*a* may be an inside tubular part (driving shaft is fitted into the center thereof), or may be integral with the driving shaft. In the embodiment of FIGS. 6(*a*) and 6(*b*), for easy understanding, the transmission mechanism part is constituted by three parts (20*c*, 20*d*, 20*e*); however, it is possible to constitute using less number of parts or more parts.

A given number of cam surfaces 20*b*1 are formed on the inner surface of the driven-side part 20*b* which is an outer ring (outside tubular part). Between the cam surface 20*b*1 and the outer surface 20*a*1 of the driving-side part 20*a*, a cylindrical roller (which may be a spherical or irregularly-shaped part) 20*c* and a spring 20*d* are held by a retainer (alternate long and short dash line) 20*e*. As shown in FIG. 6(*a*), when the driving-side part 20*a* comes to rotate in the counter-clockwise direction (first direction) indicated by an arrow, the roller 20*c* advances to the mating position of the cam surface 20*b*1 by the action of the spring 20*d*, the driving-side part 20*a* and the driven-side part 20*b* are coupled by the wedge action between the cam face 20*b*1 and the outer face 20*a*1 of the driving-side part 20*a* and the rotational driving force in the counter-clockwise direction is transmitted to the driven-side part 20*b*. On the other hand, as shown in FIG. 6(*b*), when the driving-side part 20*a* comes to rotate in the clockwise direction indicated by the arrow, the roller 20*c* moves away from the mating position of the cam surface 20*b*1 against the action of the spring 20*d* and does not contact the cam surface. The connection between the driving-side part 20*a* and the driven-side part 20*b* is released and the driven-side part 20*b* idles with respect to the driving-side part 20*a*.

The above is the principle of unidirectional transmission in the one-way clutch. The cam surface may be formed on the outer surface 20*a*1 of the inner ring or a retainer may be absent in some cases. For detailed constitution of the one-way clutch, reference can be made to the prior art.

As is clear from the transmission principle of the above-mentioned one-directional transmission device, when the driving shaft is rotated in the first direction from the state in which the connection between the driving-side part and the driven-side part is released (idling state), a minute time is required until the driving-side part and the driven-side part are connected (transmission state), during which time there may be a transient state when the intended rotational driving force in the first direction is not transmitted. On the contrary, when the driving-side part is reversed from the transmission state to the second direction to release the connection, a minute time is required until the idling state is reached, during which time there may be a transient state when unintended rotational driving force in the second direction is transmitted. In the present invention, the one-directional transmission device "transmits only the rotational driving force of the driving shaft in the first direction to the driven-side part" means that when the driving shaft rotates in the first direction, a transient state where the rotational driving force is not transmitted may be included, and when the driving shaft rotates in the second direction, a transient state where the rotational driving force is transmitted may be included.

In the first embodiment, the structure for fixing the pinion member to the driven-side part of the one-directional transmission device is not particularly limited. The pinion member is not influenced by the rotation of the driving shaft and may be fixed so as to be rotationally driven by the driven-side part of the one-directional transmission device. In FIG. 1-1, for the sake of explanation, a clearance is shown between the driving shaft 2 and the central hole of the pinion 24. However, the central hole of the pinion member 24 may be in rotatable contact with the driving shaft 2, and a metal bushing or a bearing may be interposed between the central hole of the pinion member 24 and the driving shaft 2.

In the embodiments of FIG. 1-1 and FIG. 2-FIG. 5, a tubular connector 22 is fixed by screws to the driven-side part of the outer circumference of the one-way clutch 20 with a cylindrical tubular shape, the boss of the pinion member 24 is fitted into the inside of one end part of the connector 22 and is fixed by a setscrew penetrate the connector. These fixing methods are merely examples, and fixing means such as adhesion, welding, fusion splicing, press-fitting and the like can be appropriately selected.

Next, the second embodiment of the present invention is explained.

In the second embodiment of the present invention, the apparatus comprises the mechanism for converting rotational driving force in the first direction to move the driven unit, which is further provided, in a direction away from the object, and the driven unit is movably constituted. As shown in FIG. 1-2, the mechanism comprises a driven unit 40 having a driven-side member 41 which grips an object rotatably in cooperation with the drive-side roller 3. The mechanism is constituted to convert the rotational driving force F1 in the first direction transmitted to the driven-side part of the one-directional transmission device and move the driven unit 40 in a direction away from the object A1. As such mechanism, the following constitution is exemplified.

The constitution and action of the driving unit 10, the one-directional transmission device 20 provided on the driving shaft 2 are as explained in the first embodiment. As shown in FIG. 1-2, in the second embodiment, the driven unit 40 is movably attached on the supporting member B1 to move on a moving path including a contact position at which the driven-side member 41 contacts the object A1 and a spaced position at which the driven-side member 41 is away from the object A1. A propulsive force applying device 31 is provided between the driven unit 40 and the supporting member B1 such that a forward directional force F4 that moves the driven-side member 41 in the direction of the contact position and contacts same with the object A1 is applied to the drive-side roller. One end of the propulsive force applying device 31 is fixed at any appropriate position of the driving unit 10 and the other end of the propulsive force applying device 31 is fixed at any appropriate position of the supporting member B1. The forward direction of the driven-side roller 3 in the first embodiment and the forward direction of the driven-side member 41 in the second embodiment are opposite directions facing each other.

A first pulley member 24P is provided on the driven-side part of the one-directional transmission device 20, a second pulley member 27 is provided on the supporting member B1, and an endless belt member 28 is set around between the first pulley member and the second pulley member. The structure for fixing the first pulley member 24 to the driven-side part of the one-directional transmission device 20 is not particularly limited, and a tubular connector 22 or the like may be used as in the first embodiment. The endless belt member 28 has a straight segment 28S that moves in a backward direction opposite to the forward direction of the driven-side part 41 when the first pulley member 27 rotates in the first direction. The driven unit 40 is fixed to the straight segment 28S. In FIG. 1-2, the driven unit 40 is fixed to the straight segment 28S via the fixing member 45.

The first pulley member 24P receives the rotational driving force F1 in the first direction transmitted via the one-directional transmission device 20 and rotates. The endless belt member 28 rotates due to the rotational driving force F1 of the first pulley member 24P, and the straight segment 28S to which the driven unit 40 is fixed moves in the reverse backward direction opposite to the forward direction against the forward directional force F4 from the propulsive force applying device 31. As described above, when the driving shaft 2 rotates in the first direction, the driven unit 40 moves in the backward direction by the endless belt member 28.

Similar to the first embodiment, what is important here is that the one-directional transmission device 20 is interposed between the driving shaft 2 and the first pulley member 24P, whereby only the rotational driving force F1 in the first direction of the driving shaft 2 is transmitted to the first pulley member 24P. As a result, similar to the first embodiment:

(i) when the driving shaft 2 rotates in the first direction, the first pulley member 24P receives the rotational driving force F1 in the first direction, and moves the straight segment 28S of the endless belt member 28 in the backward direction, whereby the driven-side member 41 moves to the spaced position;

(ii) on the other hand, when the driving shaft 2 rotates in the second direction, the rotational driving force F2 in the second direction is not transmitted to the first pulley member 24P, and the first pulley member 24P idles with respect to the drive shaft 2. Therefore, the straight segment 28S of the endless belt member 28 cannot resist the forward directional force F4 in the forward direction by the propulsive force applying unit 31, moves in the forward direction according to the force F4 (i.e., endless belt member 28 moves in cycle), and therefore, the driven-side member 41 also moves in the forward direction and reaches the contact position. At the contacting position, moreover, since the driven-side member 41 presses the specimen container A1 against the drive-side roller 3 with the forward directional force F4, the specimen container A1 receives the rotational driving force F2 of the driving shaft 2 and rotates. As described above, by the single common drive source device, the travelling of the driven-side member 41 and the operation of rotating the object A1 are achieved.

The principle by which the travelling of the driven-side member 41 and the operation of rotating the object can be achieved by a single driving source device in the second embodiment is the same as that described in the first embodiment explained above.

When the driven-side member 41 is the below-mentioned driven-side roller, a preferable moving operation thereof is, as shown in FIG. 1-2, a moving operation in which a rotation central axis (not shown) of the driven-side roller approaches in parallel with the rotation central axis (not shown) of the specimen container A1 held at a given position, the roller contacts, and leaves therefrom. Here, the movement to the contact position is also referred to as a "forward movement", and the movement to the spaced position is also referred to as a "backward movement". To enable such movement operation, the driven unit 40 is movably retained relative to the supporting member B1.

As a driving force for moving the driven unit 40 retained movably as mentioned above, a rotational driving force of the driving shaft is utilized also in the second embodiment. A first pulley member 24P is mounted on the driving shaft 2 and a second pulley member 27 is fixed on the supporting member B1 to convert the rotational driving force into a driving force for linear movement. A one-directional transmission device 20 is interposed between the driving shaft 2 and the first pulley member 24P.

When the first pulley member 24P is directly fixed to the driving shaft 2, the first pulley member 24P drives the endless belt member 28 according to the rotation of the driving shaft 2 in two way directions. When the straight segment 28S of the endless belt member 28 moves forward or backward, the driven unit 40 and the driven-side member 41 also move integrally. However, with such constitution alone, when the drive-side roller 3 is rotated to rotate the specimen container A1 while the drive-side roller 3 is in contact with the specimen container A1, the first pulley member 24P also rotates in conjunction. Thus, the driven-side member 41 comes to further advance in a direction to bite into the specimen container or comes to separate from the specimen container. Therefore, in a constitution without a one-directional transmission device, the specimen container cannot be gripped and rotated preferably by the drive-side roller 3 and the driven-side member 41.

In the present invention, therefore, as shown in the embodiment of FIG. 1-2 and the second embodiment, the one-directional transmission device 20 was further added between the driving shaft 2 and the first pulley member 24P, and only the rotational driving force F1 in the first direction for moving backward the driven-side member 41 out of the rotational driving forces in two way directions (F1, F2) of the driving shaft 2 is transmitted to the first pulley member 24P. Therefore, the rotation of the drive shaft 2 in the first direction moves the driven-side member 41 backward. On the other hand, when the driving shaft 2 rotates in the second direction which is the opposite direction, the rotational driving force F2 in the second direction is not transmitted to the pulley member 24P due to the action of the one-directional transmission device 20. That is, the rotation of the drive shaft 2 in the second direction cannot move the driven-side member 41 forward.

In the second embodiment, to apply a forward directional force (gripping force by drive-side roller 3) F4 that moves the driven-side member 41 forward and contacts same with the specimen container, a propulsive force applying device 31 is disposed. The forward directional force (returning force of spring when the propulsive force applying device is spring, as in the first embodiment, the forward directional force is hereinafter to be also referred to as propulsive force) F4 imparted by the propulsive force applying device 31 acts as a force move forward the driven unit 40.

As described above, when the driving shaft 2 is rotated in the first direction by the constitution added with the one-directional transmission device 20 and propulsive force F4 imparted by the propulsive force applying device 31, the rotational driving force F1 is transmitted to the first pulley member 24P by the one-directional transmission device 20. Thus, the endless belt member is driven and moves backward against the propulsive force F4 of the propulsive force applying device 31. Therefore, the driven-side member 41 also moves backward and disengages from the specimen container A1.

On the other hand, when the driving shaft 2 rotates in the second direction, the rotational driving force F2 in the second direction is not transmitted to the first pulley member 24P by the action of the one-directional transmission device. The driven-side member 41 moves forward only by the propulsive force (spring returning force in FIG. 1-2) F4 of the propulsive force applying device 31, and the driven-side member 41 reaches the contact position defined by the outside diameter of the specimen container, is pushed against the specimen container A1 by the propulsive force F4 of the propulsive force applying device and grips the specimen container A1 in co-operation with the drive-side roller 3. In this state, the specimen container A1 receives the rotational driving force F2 in the second direction from the drive-side roller 3 and rotates.

Also in the second embodiment, similar to the first embodiment, the driven unit 40 cannot always move forward unlimitedly at a high speed even if the propulsive force F4 of the propulsive force applying device 31 acts. When the driving shaft 2 rotates in the second direction and the driven unit 40 and the straight segment 28S of the endless belt member move forward by the propulsive force F4 of the propulsive force applying device 31, the rotating speed of the first pulley member 24P in the second direction cannot exceed the rotating speed of the driving shaft 2 in the second direction. This is because when the rotating speed of the first pulley member 24P in the second direction exceeds the rotating speed of the driving shaft 2 in the second direction, the driving shaft 2 relatively rotates in the first direction, and the driving force transmission action of the one-directional transmission device 20 is activated. Therefore, the rotating speed of the driving shaft 2 in the second direction is the upper limit of the rotating speed of the first pulley member 24P in the second direction (upper limit of moving speed of endless belt member), and the forward moving speed of the driven-side member 41 can be controlled by controlling the rotating speed of the driving shaft 2 in the second direction.

When the propulsive force applying device 31 is an elastic member such as spring, the propulsive force (returning force) F4 thereof changes according to the position of the driven-side member 41, and the returning force F4 at the contact position is a contacting force (pushing force or gripping force). In a state in which the driven-side member 41 is pressed against the specimen container A1 by the propulsive force F4 (i.e., when specimen container A1 is gripped), the driving shaft 2 can continue to rotate in the second direction (direction of F2) together with the drive-side roller 3 without rotating the first pulley member 24P. Therefore, the specimen container A1 preferably follows the drive-side roller 3 and rotates in a direction opposite to the second direction.

As mentioned above, in the second embodiment of the present invention, the common driving source device, the one-directional transmission device, the first and second pulley members, the endless belt member and the propulsive force applying device are skillfully combined to create the travelling operation to contact the driven-side member 41 with the specimen container A1 (forward moving and contact by the propulsive force of the propulsive force applying device), the travelling operation to set the driven-side member 41 away from a specimen container (backward moving by the rotational driving force F1 of the first direction), and the rotational motion for rotating a specimen container (rotation by the rotational driving force F2 of the second direction).

The endless belt member 28 and the pulley members (first pulley member 24P, second pulley member 27) may be a general V belt and V pulley. However, to certainly transmit the rotational driving force F1 of the driving shaft 2 and its rotation amount to the endless belt member without slipping, toothed belt (timing belt) and toothed pulleys, roller chain and sprockets and the like are preferable and particularly, toothed belt and toothed pulleys are preferable since the belt is light and quiet.

The fixing member 45 is a member having a portion fixed to the straight segment 28S and a portion fixed to the driven unit 40, the embodiment thereof is not limited, may be any as long as it can fix the driven unit 40 to the straight segment 28S. In the embodiment of FIG. 1-2, the fixing member 45 is a coupler having a clamping part for gripping (bolting) the straight segment 28S of the endless belt member 28 by two pieces of plate and a part fixed to the driven unit 40.

In the second embodiment, each part of the first embodiment may be referred to for each part (supporting member, driving source apparatus, transmit apparatus, driving shaft, drive-side roller and the like) other than the mechanism using the first pulley member, the second pulley member, endless belt member. As for the propulsive force applying device 31 in the second embodiment, the propulsive force applying device 30 in the first embodiment may be referred to except that the direction of the propulsive force is opposite.

Figure 5:
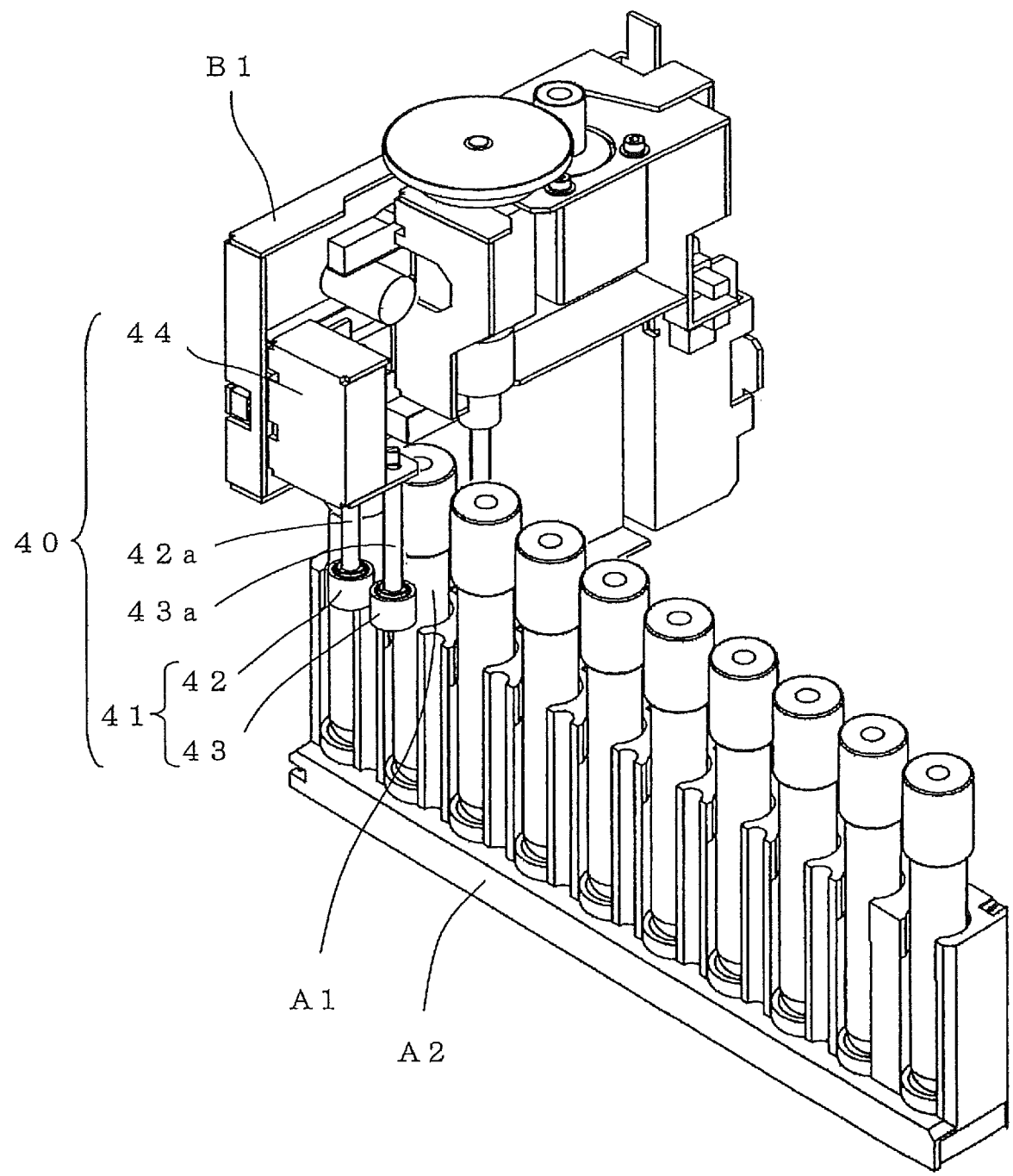
FIG. 5 shows one embodiment of the positional relationship between the apparatus and the carrying holder holding specimen containers in the first embodiment of the present invention. In this Figure, one of the specimen containers held by the carrying holder is positioned between the drive-side roller and the driven-side roller in the apparatus.

In the second embodiment, the drive-side roller 3 is positioned at a position in contact with the outer surface of the specimen container A1 or in the vicinity thereof. As shown in FIG. 5, many specimen containers sequentially move a space between the drive-side roller and the driven-side member and stop at the gripping position. The central value of the outside diameter of many specimen containers differs by a trace amount depending on the manufacturer, and even when the specimen containers are made by the same manufacturer, a manufacturing error in the outer diameter occurs.

However, by gently holding the specimen container in the carrying holder A2 or the like so that the specimen container can move comparatively freely in the lateral direction by about several mm, the specimen container can be pushed by the driven-side member 41 and move to the drive-side roller 3. Even if the outer surface of the drive-side roller 3 protrudes somewhat in the transporting path of the specimen container, when the specimen container that has moved to the gripping position hits the outer surface of the drive-side roller 3, the specimen container can move in the lateral direction without resistance.

In this way, even when the drive-side roller 3 is disposed at the fixed position, many specimen containers can be sent in the space between the drive-side roller and the driven-side member, and the specimen container can be gripped preferably by the drive-side roller 3 and the driven-side member 41.

Similarly, even when the apparatus has the driven-side member 41 in the first embodiment, by gently holding the specimen container in the carrying holder A2 or the like, the specimen container can be pushed by the drive-side roller 3 and moved to the driven-side member 41. Therefore, even with a constitution in which only the drive-side roller 3 is moved, the specimen container can be preferably gripped.

In the preferable first and second embodiments of the present invention, the following phenomenon that occurs when the drive-side roller leaves the specimen container after contacting the specimen container and rotating same to an intended position was noted, the phenomenon was taken as a further problem to be solved, and a constitution for solving the problem was added to the apparatus.

As mentioned above, in the first embodiment, the drive-side roller rotates in the second direction to rotate the specimen container. Then, after completion of the rotation of the specimen container, the drive-side roller rotates in the first direction and, using the rotational driving force of the pinion member, the roller leaves the specimen container against the propulsive force of the propulsive force applying device. That is, due to the unique constitution of the apparatus, the drive-side roller leaves the specimen container while rotating in the first direction. Due to this distinct movement, the drive-side roller reduces the pushing force on the specimen container and, in an extremely short time before leaving the specimen container, the specimen container may rotate by a trace amount due to the influence of the rotation of the drive-side roller in the first direction.

In the conventional analyzing system, further rotation of the specimen container after reading the information on the label upon rotation of the specimen container does not cause any problem. This is because the specimen container is rotated again when the label information is read again after transferring the specimen container to an inspection stage.

In contrast, in a preferable embodiment of the present invention, it is proposed to preserve the position of the specimen container after rotation on the carrying holder and to utilize the position during confirmation in the latter stage. This eliminates the need to rotate the specimen container again at the time of reconfirmation of the label information at a subsequent stage. In a preferable embodiment of the present invention, therefore, as shown in FIG. 1-1, FIG. 1-2, FIG. 2, a second one-directional transmission device 6 is interposed between the driving shaft 2 and the drive-side roller 3. The second one-directional transmission device 6 transmits only the rotational driving force F2 in the second direction of the driving shaft 2 to the drive-side roller, contrary to the transmission action of the above-mentioned one-directional transmission device 20. In the embodiment of the Figure, the second one-directional transmission device is disposed in a posture in which the first one-directional transmission device is put upside down.

By this constitution, when the drive-side roller rotates in the second direction to rotate the specimen container A1 and leaves the specimen container, even if the driving shaft 2 rotates in the first direction, the rotational driving force F1 in the first direction is not transmitted to the drive-side roller due to the action of the second one-directional transmission device. Therefore, drive-side roller 3 can leave specimen container A1 without rotating the specimen container A1 (i.e., while preserving the position of label A11 of the specimen container A1), and the position of the specimen container can be maintained.

The manner in which the second one-directional transmission device is applied to the drive-side roller 3 described above may be applied to the first and second embodiments. It is particularly preferable for the first embodiment in which the drive-side roller 3 itself moves, and pushes and leaves the specimen container A1.

As the second one-directional transmission device 6, a commercially available one-way clutch having the same structure as the above-mentioned one-directional transmission device 20 is preferably used, and a smaller one that fits inside the roller is preferable. In the embodiments of FIG. 1-1, FIG. 1-2 and FIG. 2-FIG. 5, one-way clutch having a cylindrical tubular shape is used as the second one-directional transmission device 6. The driving-side part of the one-way clutch is fixed to the driving shaft 2 or integrated with the driving shaft 2, and a drive-side roller is fixed to the driven-side on the outer circumference thereof. As in the above-mentioned one-directional transmission device 20, these fixing methods can be appropriately selected from fixing means such as adhesion, welding, fusion splicing, press-fitting and the like.

Similar to the second embodiment, also in the first embodiment, the apparatus preferably has a driven-side member 41 which cooperates with the aforementioned drive-side roller 3 to grip the target specimen container A1 in a rotatable manner.

Figure 8:
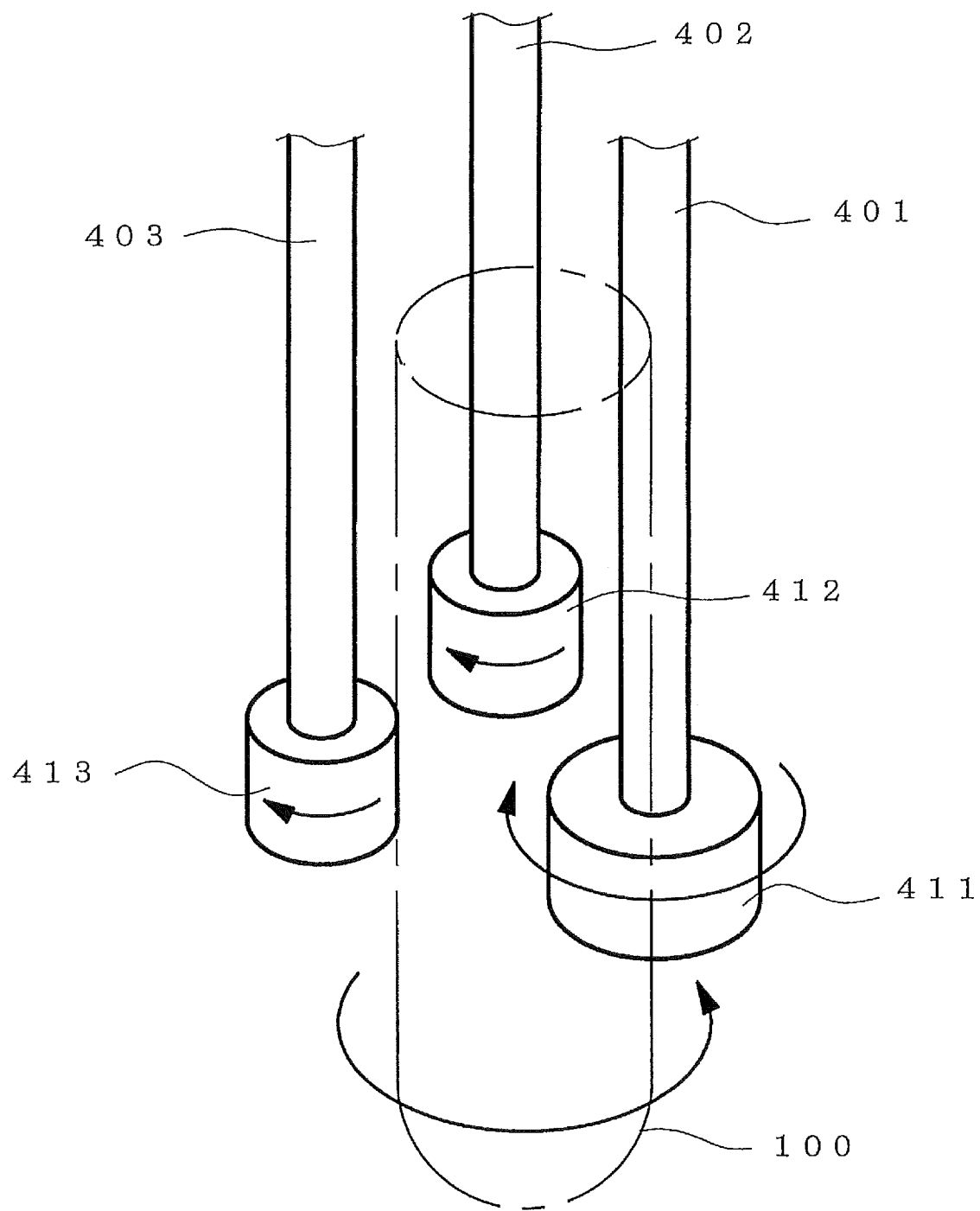
FIG. 8 is a perspective view schematically showing the configuration of three rollers for gripping and rotating a specimen container in the prior art.
Figure 9:
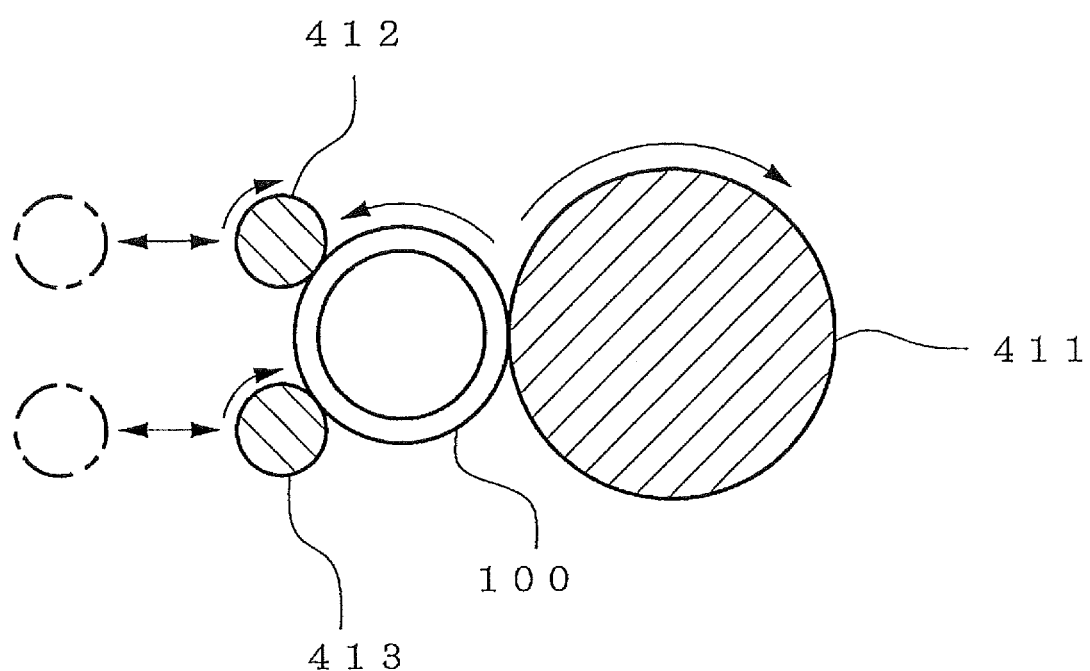
FIG. 9 shows operation of three rollers shown in FIG. 8, and shows sections (sectional view cut along a plane perpendicular to each rotation central axis) of the specimen container and each roller.

In the first and second embodiments, a preferable embodiment of the driven-side member 41 is freely rotatable two driven-side rollers 42 and 43. These two driven-side rollers 42, 43 preferably have a surface layer made of an elastic and flexible organic polymer material, like the drive-side roller 3. The drive-side roller 3 and two driven-side rollers 42, 43 are preferably arranged to hold the specimen container with three points, as in the prior art shown in FIG. 8.

Figures 1, 4:
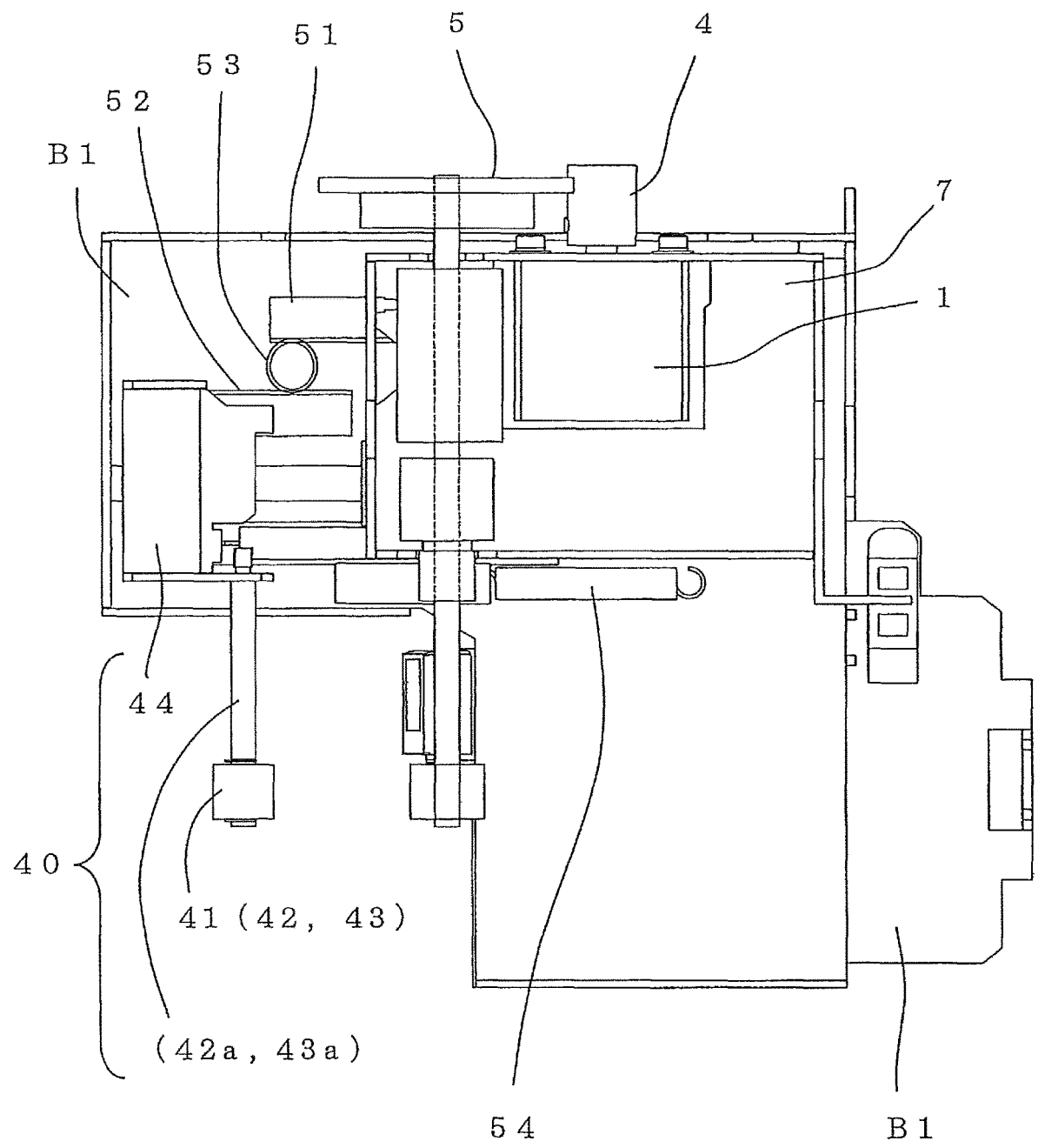
Figures 2, 4:
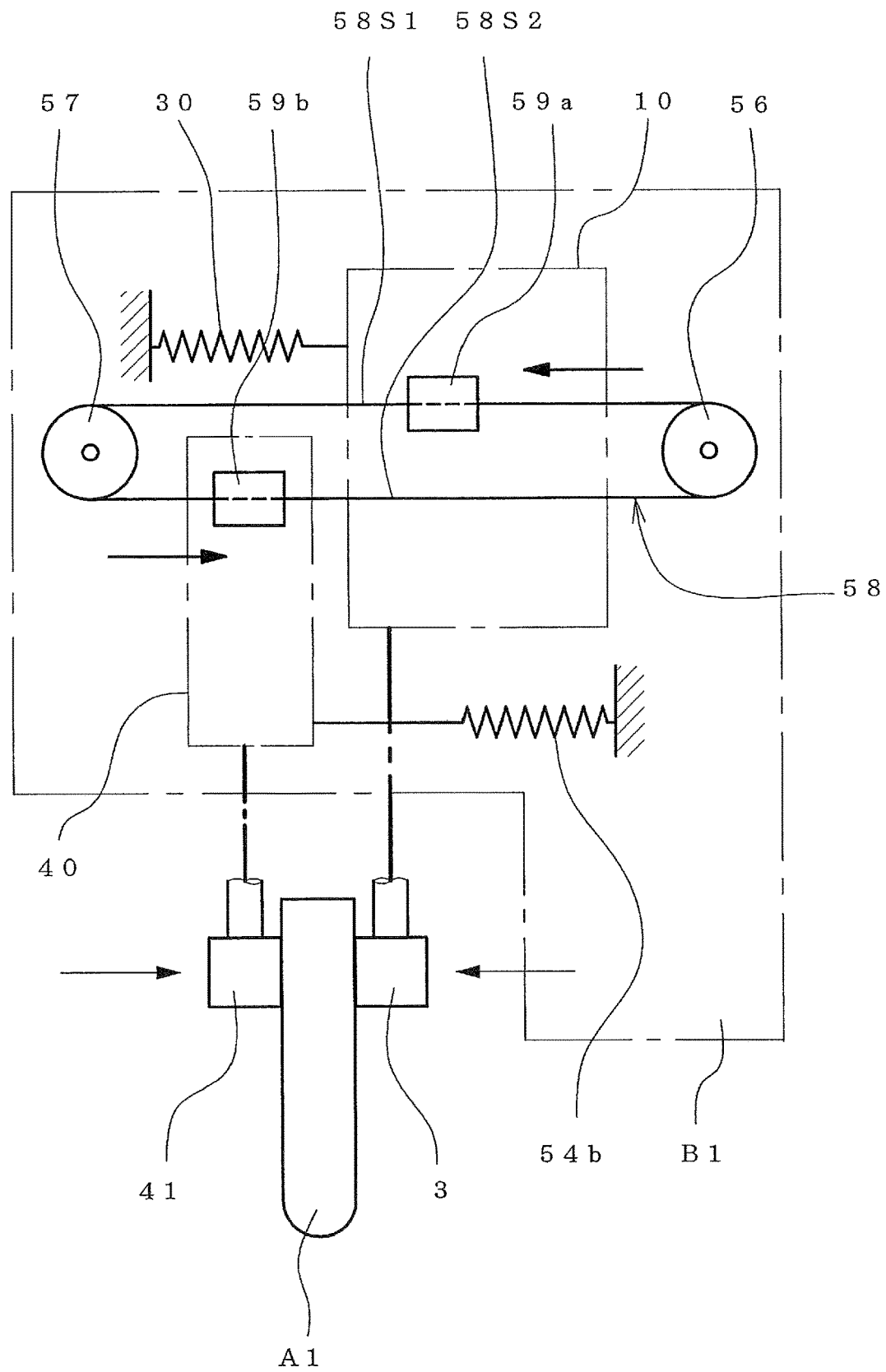

As preferably shown in FIG. 4, FIG. 3, in the first and second embodiments of the present invention, the driven-side members (driven-side rollers 42, 43) are a part of the driven unit 40. The driven unit 40 is constituted to have at least two driven shafts 42a, 43a respectively having driven-side rollers 42, 43 at the tip.

In the first embodiment, the driven-side member 41 (driven-side rollers 42, 43 in preferable first embodiment) may be immovably fixed at a fixed position approaching the specimen container A1. In a preferable first embodiment, as in the embodiments shown in FIG. 3-FIG. 5, it is constituted to cooperate in synchronism with the drive-side roller to perform an open/close operation and grip and release the specimen container. A specific embodiment of the mechanism (open/close mechanism) performing the open/close operation is explained below.

First Embodiment of Open/Close Mechanism

In the first embodiment of the open/close mechanism, the driving unit and the driven unit simultaneously move in opposite directions by a pair of rack members and one pinion.

As shown in FIG. 4-1, FIG. 5, the driven unit 40 has a bracket 44, two driven shafts 42a, 43b are fixed to the bracket 44 and extend downward. The bracket 44 is movably attached on the supporting member B1 by a mechanism similar to the bracket 7 of the driving unit 10.

As clearly shown in FIG. 3, the second rack member 51 extends from the bracket 7 of the driving unit 10, and the third rack member 52 extends from the bracket 44 of the driven unit (not shown in FIG. 3). The second rack member 51 and the third rack member 52 are disposed with their teeth facing each other, the second pinion member 53 pivotably supported on the supporting member B1 is disposed between them and the second rack member 51 and the third rack member 52 respectively mate with the second pinion member 53. By this constitution, when the driving unit moves in one direction (e.g., left direction in FIG. 3), the second rack member 51 rotates the second pinion member 53, moves the third rack member 52 in the right direction, and the driven unit 40 also moves in the right direction. That is, the movement of the driving unit in one direction causes movement of the driven unit in the opposite direction, the drive-side roller 3 and the driven-side member 41 (driven-side rollers 42, 43) simultaneously approach the specimen container A1 and grip the specimen container, and simultaneously leave the specimen container and release the specimen container.

In the embodiments shown in the Figures, the second rack member 51 and the third rack member 52 are each a rack, the second pinion member 53 is a pinion, and the above-mentioned rack member and the pinion member may be combined.

Second Embodiment of Open/Close Mechanism

In the second embodiment of the open/close mechanism, the driving unit and the driven unit simultaneously move in the opposite directions by using two parts that move in opposite directions in one endless belt member.

FIG. 4-2 schematically shows the constitution of the second embodiment, in which a pair of pulley members 56, 57 are provided on the supporting member B1. An endless belt member 58 is set around between the pair of pulley members. The endless belt member 58 has a pair of straight segments 58S1, 58S2 extending in parallel with the forward direction of the driving unit 10 and moving in mutually opposite directions. Of the pair of straight segments, the driving unit 10 is fixed to one straight segment 58S1 via a fixing member 59a, and the driven unit 40 is fixed to the other straight segment 58S2 via a fixing member 59b.

By this constitution, the movement of the driving unit 10 in one direction (left direction shown by arrow) causes movement of the driven unit 40 in the opposite direction (right direction shown by arrow) via endless belt member 58. As a result, the drive-side roller 3 and the driven-side member 41 (driven-side roller) simultaneously approach the specimen container A1 and grip the specimen container, and simultaneously leave the specimen container A1 and release the specimen container.

In the embodiment of FIG. 4-2, a pair of pulley members 56, 57 are directly provided on the surface of the supporting member B1. The rotation central axis of these pulleys extends in the horizontal direction from the surface of the support member B1, but it is not limited thereto, and the rotation central axis of these pulleys may extend in the vertical direction by using an L-shaped bracket or the like.

The endless belt member is not particularly limited and may be a flat belt. An endless belt member showing little elongation even when subjected to a pulling force is preferable.

As for the fixing members 59a, 59b, the fixing member 45 explained above can be referred to.

In the aforementioned open/close mechanisms, as shown in FIG. 4-1 (or FIG. 4-2), the second propulsive force applying device 54 (or 54b) is set between the driven unit 40 and the supporting member B1. One end of the second propulsive force applying device is fixed at any appropriate position of the driven unit 40 and the other end of the second propulsive force applying device is fixed at any appropriate position of the supporting member B1. In the embodiment of the Figure, the second propulsive force applying device is a spring. The spring is set in a shape deformed from the original shape, and a returning force applies to the driven-side rollers 42, 43 as a force to grip the specimen container A1.

In the embodiments of FIG. 3-FIG. 5, similar to the driving unit 10, an extension coil spring is used as the spring 54 acting on the driven unit 40. As clearly shown in FIG. 3, FIG. 4-1, the extension coil spring 54 is mounted between the bracket 44 and the supporting member B1, and the pulling force in the direction heading for the specimen container A1 acts on the driven unit 40 through the bracket 44 (the engaging portion of the extension coil spring 54 and the supporting member B1 is not shown). The force (returning force in the case of a spring) of the second propulsive force applying device 54 (or 54b) to be applied to the driven unit 40 may be determined as appropriate. In the first embodiment of the open/close mechanism, the force of the second propulsive force applying device 54 also acts on the driving unit through the third rack member 52, the pinion member 53, and the second rack member 51 to increase the gripping force and the contacting force. Therefore, when applying the second propulsive force applying device 54, the propulsive force F3 of the propulsive force applying device on the driving unit side can also be weakened. Similarly, in the second embodiment of the open/close mechanism, the force of the second propulsive force applying device 54b also acts on the driving unit through the endless belt 58 to increase the gripping force and the contacting force. Therefore, when applying the second propulsive force applying device 54b, the propulsive force F3 of the propulsive force applying device on the driving unit side can also be weakened.

In the first embodiment, the second propulsive force applying device 54 (or 54b) is not essential. By providing a second propulsive force applying device (in particular extension coil spring) 54 (or 54b)) in the moving mechanism of the driven unit 40 as described above, the driven unit 40 has no play in the moving direction, and it is possible, even though with a simple structure, to apply a gripping force in a favorable balance to the specimen container from both the drive-side roller and the drive-side roller.

As shown in FIG. 3, it is preferable to appropriately provide various types of supplementary sensors such as a sensor 60 for detecting the presence or absence of a specimen container, a sensor 61 for detecting forward and backward movements of the driving unit and the like to the apparatus.

For example, if there is a sensor 60 for detecting the presence or absence of the specimen container and the specimen container is not held in the carrying holder, it is possible to feed the carrying holder and access the next specimen container without performing unnecessary forward motion.

The fact that the position of the label affixed to the body of the specimen container has reached the preferable position as a result of the rotation of the specimen container can be detected using a barcode reader that reads a barcode on the label or an appropriate detection sensor. Therefore, according to the detection results, the rotation of the drive-side roller is discontinued and the rotation of the specimen container is stopped.

FIG. 5 shows one example of the positional relationship between a carrying holder holding many specimen containers and a drive-side roller and driven-side members (two driven-side rollers) of the apparatus.

The specimen container to be rotated may simply pass through between the drive-side roller and the driven-side members (two driven-side rollers) or the specimen container may be moved after the drive-side roller and the driven-side members are once raised above the specimen container, or the like.

These embodiments can be appropriately determined according to how far the drive-side roller and the driven-side member are separated from the specimen container and the like.

It is preferable to associate the operation of the apparatus with the feed of the carrying holder; for example, the carrying holder is sent when the drive-side roller and the driven-side members are separated from the specimen container.

The apparatus of the present invention may be one independent apparatus, and may be provided with a control part for controlling the operation of the driving source device 1 and accompanying sensors. Alternatively, the apparatus of the present invention may be a one stage apparatus of an analyzing system on a larger scale and may be controlled by a control unit for the entire analysis system.

The object to be rotated by the apparatus of the present invention may be, for example, a container such as a bottle or a can, a material to be processed, a measurement object and the like, in addition to the above-mentioned specimen container.

When the object is a specimen container, the specimen container may be a container containing a specimen to be analyzed such as blood, urine, and feces collected from the living body (blood collection tube or the like) or a container containing any analysis specimen such as mineral and the like.

The purpose of the apparatus of the invention to rotate the object is not particularly limited and may be any rotation such as rotation for reading the description (barcode etc.) of a label affixed to the surface of the object or a description directly printed on the surface of the object, rotation for inspecting the object from multiple directions, rotation for processing the object from multiple directions, rotation for agitating the fluid contained in the container (liquid sample contained in the specimen container) and the like.

INDUSTRIAL APPLICABILITY

According to the apparatus of the present invention, a common one driving source device can achieve a moving operation for a driving unit or a driven unit to contact the object and a rotational motion for the driving unit to rotate the object. The apparatus is particularly useful for rotating the specimen container in reading a label of the specimen container such as blood collection tubes held in a carrying holder and the like, and the like.

This application is based on a patent application No. 2015-243974 filed in Japan (filing date: Dec. 15, 2015), the contents of which are incorporated in full herein.

EXPLANATION OF REFERENCE CHARACTERS 1 driving source device
2 driving shaft
3 drive-side roller
10 driving unit
20 one-directional transmission device
22 connector
24 pinion member
26 rack member
24P first pulley member
27 second pulley member
28 endless belt member
30 propulsive force applying device
40 driven unit
41 driven-side member
A1 object
B1 supporting member
F1 rotational driving force in the first direction
F2 rotational driving force in the second direction
F3 forward directional force by propulsive force applying device in the first embodiment
F4 forward directional force by propulsive force applying device in the second embodiment

The invention claimed is:

1. An apparatus for rotating an object, comprising:
   a driving unit comprising a driving shaft and a driving source device for rotating the driving shaft in two way directions of a first direction and a second direction, the driving shaft comprising a drive-side roller for transmitting a rotational motion to the object upon contact with the object, the driving shaft including a one-directional transmission device, the one-directional transmission device comprising a driving-side part and a driven-side part, the driving shaft being fixed to the driving-side part or integrated with the driving-side part, and the one-directional transmission device comprising a mechanism for transmitting only a rotational driving force in the first direction of the driving shaft to the driven-side part;
   a supporting member supporting the driving unit or a driven unit;
   a propulsive force applying device configured to apply a forward directional force to the driving unit or the driven unit; and
   a mechanism for converting the rotational driving force in the first direction to be transmitted to the driven-side part of the one-directional transmission device and moving the driving unit in a direction away from the object, or a mechanism for converting the rotational driving force in the first direction to be transmitted to the driven-side part of the one-directional transmission device and moving the driven unit in a direction away from the object, wherein
   the driven unit comprises a driven-side member gripping the object rotatably in cooperation with the drive-side roller, and
   the drive-side roller is rotated to transmit rotational motion to the object by the rotational driving force in the second direction of the driving shaft.

2. The apparatus according to claim 1, comprising the mechanism for converting the rotational driving force in the first direction and moving the driving unit in a direction away from the object, wherein
   the driving unit is movably mounted on the supporting member such that the drive-side roller moves on a moving path comprising a contact position at which the drive-side roller contacts the object and a spaced position at which the drive-side roller is away from the object,
   the propulsive force applying device is provided between the driving unit and the supporting member such that the forward directional force is applied to the drive-side roller to move the drive-side roller in the direction of the contact position and contact the drive-side roller with the object, and
   the driven-side part of the one-directional transmission device is provided with a pinion member, the supporting member is provided with a rack member mating with the pinion member, the rotational driving force in the first direction is transmitted to the pinion member via the one-directional transmission device, the pinion member moves on the rack member in a backward direction opposite from the forward direction and against the forward directional force applied by the propulsive force applying device, whereby the driving unit moves in the backward direction.

3. The apparatus according to claim 2, further comprising a driven-side member, said driven-side member being a member for gripping the object rotatably in cooperation with the drive-side roller when the drive-side roller contacts the object in a manner permitting rotation of the object.

4. The apparatus according to claim 3, comprising the driven unit, wherein the driven unit comprises the driven-side member and is movably retained on the supporting member,
a second rack member extends from the driving unit, a third rack member extends from the driven unit, the second rack member and the third rack member, with their respective teeth facing each other, are mating with a second pinion member rotatably supported between them, and
the second rack member, the third rack member and the second pinion member are relationally assembled such that a movement of the driving unit in one direction causes a movement of the driven unit in the opposite direction, and the drive-side roller and the driven-side member simultaneously approach and grip the object and simultaneously leave and release the object.

5. The apparatus according to claim 4, wherein a second propulsive force applying device is provided between the driven unit and the supporting member such that a force in a grip direction is applied to the driven-side member.

6. The apparatus according to claim 3, comprising the driven unit, wherein the driven unit comprises the driven-side member and is movably retained on the supporting member,
the supporting member is provided with a pair of pulley members, an endless belt member is set around the pair of pulley members, and the endless belt member comprises a pair of straight segments extending in parallel with the forward direction and moving in the opposite direction with each other,
of the pair of the straight segments, the driving unit is fixed on one straight segment and the driven unit is fixed on the other straight segment, whereby a movement of the driving unit in one direction causes a movement of the driven unit in the opposite direction via the endless belt member, thus the drive-side roller and the driven-side member simultaneously approach and grip the object and simultaneously leave and release the object.

7. The apparatus according to claim 6, wherein a second propulsive force applying device is provided between the driven unit and the supporting member such that a force in a grip direction is applied to the driven-side member.

8. The apparatus according to claim 3, wherein the driven-side member are two driven-side rollers gripping the object rotatably at three points in cooperation with the drive-side roller.

9. The apparatus according to claim 1, comprising the mechanism for converting the rotational driving force in the first direction and moving a driven unit further-provided in a direction away from the object, wherein
the driven unit is movably mounted on the supporting member such that the driven-side member moves on a moving path comprising a contact position at which the driven-side roller contacts the object and a spaced position at which the drive-side roller is away from the object,
the propulsive force applying device is provided between the driven unit and the supporting member such that the forward directional force is applied to the driven-side member to move the driven-side member in the direction of the contact position and contact the driven-side member with the object, and
the driven-side part of the one-directional transmission device is provided with a first pulley member, the supporting member is provided with a second pulley member, an endless belt member is set around the first pulley member and the second pulley member, and the endless belt member comprises a straight segment that moves in a backward direction opposite to the forward direction when the first pulley member rotates in the first direction,
the driven unit is fixed on the straight segment, the rotational driving force in the first direction is transmitted to the first pulley member via the one-directional transmission device, the straight segment moves in a backward direction against the forward directional force applied by the propulsive force applying device, whereby the driven unit moves in the backward direction.

10. The apparatus according to claim 9, wherein the driven-side member are two driven-side rollers gripping the object rotatably at three points in cooperation with the drive-side roller.

11. The apparatus according to claim 1, wherein a second one-directional transmission device is interposed between the driving shaft and the drive-side roller, and the second one-directional transmission device is a device for transmitting only the rotational driving force in the second direction of the driving shaft to the drive-side roller.

12. The apparatus according to claim 1, wherein the driving source device is a motor controllable to rotate in two way directions.

* * * * *